United States Patent
Difonzo et al.

(10) Patent No.: US 11,886,253 B1
(45) Date of Patent: Jan. 30, 2024

(54) MAGNETIC FIELD ADJUSTMENTS TO A MAGNETIC LATCH FOR PRODUCING ACCURATE KINEMATICS IN A COMPUTING DEVICE

(71) Applicant: Apple Inc., Cupertino, CA (US)

(72) Inventors: John C. Difonzo, Emerald Hills, CA (US); Hao Zhu, San Jose, CA (US); Bryce W. Wilson, Cupertino, CA (US); Andrea Del Prete, Canegrate (IT); Stefano Tizianel, Legnano (IT); Noemi Novello, Parabiago (IT); Maurizio Bertoldo, Oleggio (IT)

(73) Assignee: Apple Inc., Cupertino, CA (US)

( * ) Notice: Subject to any disclaimer, the term of this patent is extended or adjusted under 35 U.S.C. 154(b) by 999 days.

(21) Appl. No.: 16/289,607

(22) Filed: Feb. 28, 2019

Related U.S. Application Data

(60) Provisional application No. 62/728,525, filed on Sep. 7, 2018.

(51) Int. Cl.
*G06F 1/16* (2006.01)
*H01F 13/00* (2006.01)
*H01F 7/02* (2006.01)

(52) U.S. Cl.
CPC .......... *G06F 1/1679* (2013.01); *G06F 1/1616* (2013.01); *H01F 7/0263* (2013.01); *H01F 13/006* (2013.01)

(58) Field of Classification Search
CPC .... G06F 1/1679; G06F 1/1677; G06F 1/1616; H01F 13/006; H01F 7/0263; E05B 65/0067
See application file for complete search history.

(56) References Cited

U.S. PATENT DOCUMENTS

| | | | |
|---|---|---|---|
| 3,453,777 A | 7/1969 | Reilly | |
| 6,151,486 A * | 11/2000 | Holshouser | H04M 1/0214 455/575.8 |
| 6,366,440 B1 * | 4/2002 | Kung | E05C 19/16 361/679.55 |
| 6,653,919 B2 * | 11/2003 | Shih-Chung | G06F 1/162 335/207 |
| 6,659,516 B2 * | 12/2003 | Wang | E05C 19/163 292/202 |

(Continued)

*Primary Examiner* — Nidhi Thaker
(74) *Attorney, Agent, or Firm* — BAKERHOSTETLER

(57) ABSTRACT

This application relates to improving kinematics in a computing device such as a laptop computer. A magnetic latch mechanism includes a magnetic array and an attractor plate. The magnetic array is secured in a top portion of the laptop computer and the attractor plate is secured in a base portion of the laptop computer. An attractive force of the magnetic latch mechanism is calibrated by selectively demagnetizing a portion of one or more magnetic elements in the magnetic array to reduce the attractive force proximate a target force. The calibration technique can include exciting a demagnetizing element, such as a pair of conductive coils, with a short, high frequency demagnetization pulse to create a demagnetized zone within the magnetic array that is completely demagnetized, irrespective of unit to unit variations of magnetic properties in the initially magnetized magnetic array. This technique ensures an accurate kinematic user experience.

17 Claims, 17 Drawing Sheets

(56) References Cited

U.S. PATENT DOCUMENTS

| | | | | |
|---|---|---|---|---|
| 6,929,291 B2* | 8/2005 | Chen | | G06F 1/1679 |
| | | | | 361/732 |
| 7,583,500 B2* | 9/2009 | Ligtenberg | | G06F 1/1616 |
| | | | | 361/147 |
| 7,775,567 B2* | 8/2010 | Ligtenberg | | E05C 19/16 |
| | | | | 292/DIG. 37 |
| 8,354,909 B2* | 1/2013 | Fullerton | | G09F 7/04 |
| | | | | 335/306 |
| 8,705,229 B2* | 4/2014 | Ashcraft | | G06F 1/1679 |
| | | | | 312/223.1 |
| 8,936,691 B2 | 1/2015 | Leggett | | |
| 9,214,268 B2* | 12/2015 | DiFonzo | | H01F 7/20 |
| 9,277,661 B2* | 3/2016 | Andre | | H05K 5/0221 |
| 9,442,530 B2 | 9/2016 | Maatta et al. | | |
| 9,926,953 B2 | 3/2018 | Russell-Clarke et al. | | |
| 9,997,286 B2* | 6/2018 | Herman | | H01F 7/20 |
| 10,031,559 B1* | 7/2018 | Hamel | | H01F 7/0252 |
| 10,672,548 B2* | 6/2020 | Srinivasan | | E05C 19/16 |
| 11,106,250 B2* | 8/2021 | Weldon | | G06F 1/1654 |
| 11,227,710 B2* | 1/2022 | Good | | A41F 1/002 |
| 2007/0133156 A1* | 6/2007 | Ligtenberg | | G06F 1/1616 |
| | | | | 361/679.3 |
| 2008/0061565 A1* | 3/2008 | Lee | | E05C 19/16 |
| | | | | 292/251.5 |
| 2008/0278269 A1* | 11/2008 | Ramirez | | G06F 1/1679 |
| | | | | 335/205 |
| 2010/0123663 A1* | 5/2010 | Leung | | G06F 1/1632 |
| | | | | 345/169 |
| 2010/0283270 A1* | 11/2010 | Hood, III | | G06F 1/1679 |
| | | | | 292/251.5 |
| 2011/0116214 A1* | 5/2011 | Liu | | G06F 1/1679 |
| | | | | 361/679.01 |
| 2012/0240474 A1 | 9/2012 | Purssey | | |
| 2014/0034080 A1* | 2/2014 | Paquet | | A45C 13/1069 |
| | | | | 132/286 |
| 2014/0306463 A1* | 10/2014 | Ho | | E05C 19/16 |
| | | | | 292/251.5 |
| 2015/0262746 A1* | 9/2015 | DiFonzo | | H01F 7/0263 |
| | | | | 361/143 |
| 2017/0120401 A1 | 5/2017 | Fullerton et al. | | |

\* cited by examiner

MAGNETIC FIELD ADJUSTMENTS TO A MAGNETIC LATCH FOR PRODUCING ACCURATE KINEMATICS IN A COMPUTING DEVICE

CROSS-REFERENCE TO RELATED APPLICATIONS

The present application claims the benefit of U.S. Provisional Application No. 62/728,525, entitled "PRODUCING ACCURATE KINEMATICS IN A COMPUTING DEVICE," filed Sep. 7, 2018, the content of which is incorporated herein by reference in its entirety for all purposes.

FIELD

The described embodiments relate generally to mechanisms associated with a computing device. More particularly, the present embodiments relate to calibration techniques for ensuring a consistent user experience (UX) relating to a magnetic latch mechanism of a computing device.

BACKGROUND

Millions of laptop computers are manufactured and sold every year throughout the world. The clamshell design that separates the base portion of the laptop computer and the display portion is widely recognized and provides an effective mechanism to protect the display surface when the laptop computer is placed in a closed configuration for transport or storage. The display portion is typically attached to the base portion by means of a hinge or hinges. The opposite edge of the display portion commonly includes some kind of retaining mechanism to ensure that the display portion and base portion do not open inadvertently.

In early models of laptop computers, this retaining mechanism was commonly a mechanical latching mechanism that utilized a structural member in the base portion that interlocked with a structural member in the display portion. A button, latch, or other actuating means included in the laptop computer would be used to release the retaining mechanism such that a user could open the laptop computer. In more modern designs, the form factor of the base portion and the display portion has changed and, as a result, the mechanical retaining mechanisms used in earlier models may no longer fit within an envelope of the base portion and/or the display portion. Consequently, laptop manufacturers have re-designed the retaining mechanisms for use with laptop computers.

Some modern retaining mechanisms that have replaced many mechanical latching mechanisms use magnetic fields to retain the laptop computer in a closed configuration. For example, a magnetic element in the display portion of the laptop computer is attracted to a magnetic element in the base portion of the laptop computer. The attractive force between the corresponding magnetic elements opposes the inadvertent opening of the laptop computer.

The appearance of the laptop computer may meet a specific design goal because the structural components of the magnetic retaining mechanism are not visible to a user of the laptop computer. This can improve the UX related to a computing device compared to a similar device with a visible mechanical latching mechanism. Nevertheless, magnetic fields of magnetic elements provided by a supplier might vary significantly as tight tolerances of a strength of a magnetic field associated with a given magnetic element are not common within the market. Consequently, an attractive force of the magnetic retaining mechanism will also have a large unit to unit variance. Even though the UX related to the look of the computing device might have been improved by switching to a hidden magnetic retaining mechanism, the UX related to the feel of the computing device may suffer if the force required to open the computing device varies significantly from unit to unit. Therefore, what is needed is a technique for calibrating magnetic elements to improve the tolerances related to kinematic forces experienced by a user of the computing device.

SUMMARY

This paper describes various embodiments that relate to improving kinematics in a computing device such as a laptop computer. A magnetic latch mechanism includes a magnetic array and an attractor plate. The magnetic array is secured in a top portion of the laptop computer and the attractor plate is secured in a base portion of the laptop computer. An attractive force of the magnetic latch mechanism is calibrated by selectively demagnetizing a portion of one or more magnetic elements in the magnetic array to reduce the attractive force proximate a target force. This technique ensures an accurate kinematic user experience with the laptop computer while not imposing overly strict tolerance requirements on a supplier of the magnetic array.

In some embodiments, a method is disclosed for calibrating a magnetic latch mechanism. The method includes the steps of measuring a force associated with the magnetic latch mechanism; moving a demagnetizing element to a location relative the magnetic array of the magnetic latch mechanism, and exciting the demagnetizing element at the location with a demagnetization pulse to completely demagnetize an area of one or more magnetic elements of the magnetic array. The location is determined based on the measured force to correspond to a desired area of a demagnetized zone.

In some embodiments, a system is disclosed for calibrating the magnetic latch mechanism. The system includes a robot and a calibration assembly. The robot includes a load cell configured to measure a force associated with operating the magnetic latch mechanism. The robot can include a structural member, attached to the load cell, and configured to be inserted between the top portion and the base portion of the laptop computer. The robot can be actuated to transition the laptop computer from a closed configuration to an open configuration, measuring a force associated with a particular motion profile of the robot during the transition.

The calibration assembly is movable relative to a magnetic array of the magnetic latch mechanism. The calibration assembly includes a demagnetizing element configured to demagnetize a portion of a magnetic element of the magnetic array. The calibration assembly is configured to form a demagnetized zone in the magnetic array by: moving the demagnetizing element to a location relative the magnetic array, and exciting the demagnetizing element with a demagnetization pulse. The location is determined based on the force to correspond to a desired area of a demagnetized zone.

In some embodiments, the magnetic array includes magnetic elements arranged along a primary axis of the magnetic array. The location can be determined as a relative position between the demagnetizing element and the magnetic array along a secondary axis that is orthogonal to the primary axis of the magnetic array. In some embodiments, the desired area of the demagnetized zone is proportional to a difference between the measured force and a target force.

In some embodiments, the demagnetizing element is a conductive coil of wire, such as a copper coil, wrapped around a ferromagnetic core. The conductive coil can be connected to a current source used to drive a current through the conductive coil. A demagnetization pulse can be applied to the conductive coil to generate an external magnetic field proximate the demagnetizing element that completely demagnetizes at least a portion of one or more magnetic elements of the magnetic array. In some embodiments, the demagnetization pulse is an alternating current that decays over a period of time. A frequency and magnitude of the alternating current can be selected to create an external magnetic field that is strong enough to completely demagnetize the magnetic material within the demagnetized zone. It will be appreciated that a minimum strength of the external magnetic field needed to demagnetize the magnetic material is dependent on the coercivity of the magnetic material and to what degree the magnetic material was initially magnetized. Given a particular coercivity and full saturation of the magnetic material, a minimum strength of the external magnetic field can be determined that will result in the complete demagnetization within the demagnetized zone. The demagnetized zone can be surrounded by a transition zone where demagnetization depends on a coercivity of the magnetic element as well as a distance from the demagnetizing element when activated with the demagnetization pulse.

In some embodiments, the magnetic array comprises a one-dimensional array of permanent magnets. An orientation of magnetic dipoles of each of the permanent magnets alternates along a primary axis of the one-dimensional array. In other embodiments, the magnetic array comprises a ferromagnetic substrate having magnetic zones formed therein by magnetizing corresponding portions of the ferromagnetic substrate to have alternating magnetic dipole orientations relative a top surface of the ferromagnetic substrate.

Other aspects and advantages of the invention will become apparent from the following detailed description taken in conjunction with the accompanying drawings which illustrate, by way of example, the principles of the described embodiments.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1:
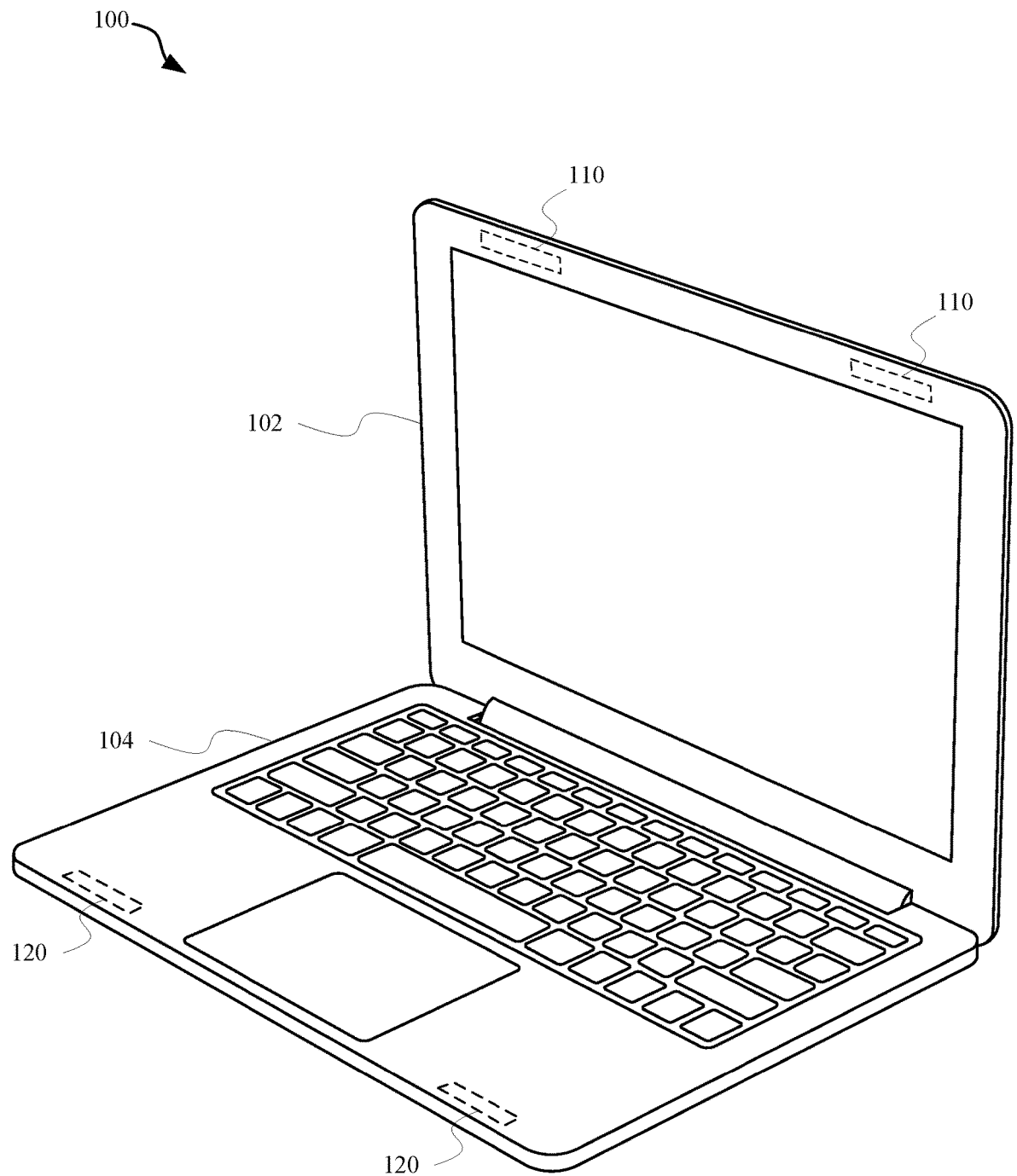
FIG. 1 illustrates a computing device, in accordance with some embodiments.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Traditional mechanical latch mechanisms used in, e.g., laptop computers have been replaced with more modern magnetic latch mechanisms that might have zero visible parts on the outside of an enclosure of the computing device. However, magnetic latch mechanisms are more difficult to strictly tolerance due to more extreme unit to unit variances in magnetic characteristics of a magnetic part (e.g., coercivity). Consequently, a technique for calibrating the magnetic elements of the magnetic latch mechanism, after an initial magnetization of the magnetic elements, can enable fine tuning of the kinematics associated with operating computing devices having said magnetic latch mechanisms implemented therein. Conventional techniques for calibrating the magnetic elements have accuracy problems that persist due to the high unit to unit variance of coercivity or other magnetic characteristics among magnetic elements utilized within the magnetic latch mechanisms.

A magnetic latch mechanism is included within a computing device. In some embodiments, the computing device is a laptop computer and the magnetic latch mechanism is implemented as a magnetic array secured within a first enclosure of the laptop computer and an attractor plate secured within a second enclosure of the laptop computer. The second enclosure is movable relative to the first enclosure. The first enclosure can be included in a top portion of the laptop computer and the second enclosure can be included in a base portion of the laptop computer.

In other embodiments, the computing device can be a tablet computer or other unitary enclosure electronic device. The tablet computer can be wirelessly connected to an auxiliary device, such as an auxiliary input device like a stylus, lens accessory, or the like. The tablet computer can include the magnetic array and the auxiliary device can include an attractor plate, where the auxiliary device is designed to be docked with the tablet computer by placing the auxiliary device proximate the magnetic array included within the tablet computer.

In some embodiments, calibration of the magnetic latch mechanism is performed by selectively demagnetizing a magnetic element in the magnetic array to reduce an attractive force associated with the magnetic latch mechanism. A demagnetized zone is formed in the magnetic element to reduce the attractive force proximate a pre-determined target force when the attractor plate is located a particular distance from the magnetic array. The demagnetized zone is characterized as a volume of magnetic material within the magnetic array that is completely demagnetized (e.g., the magnetic field within this volume is virtually undetectable).

In some embodiments, the calibration routine measures a force associated with the magnetic latch mechanism, moves a demagnetizing element to a location relative the magnetic array, and excites the demagnetizing element at the location with a demagnetization pulse to partially demagnetize a magnetic element of the magnetic array. The location is determined based on a comparison of the measured force with a target force to correspond to a desired area of a demagnetized zone. The demagnetized zone is surrounded by a transition zone that has been partially demagnetized according to a coercivity of the magnetic element. In other words, a size of a demagnetized zone formed within the magnetic element is carefully selected to reduce the measured force to, or nearly to, the pre-determined target force. Furthermore, a size of the transition zone may be minimized in a number of ways including: using a short, high frequency demagnetization pulse; using a conducting material as a mask; or using a pair of adjacent coils having opposing polarity as a demagnetizing element to concentrate the magnetic flux generated by the demagnetizing element at the demagnetized zone. The calibration routine is performed for each unit, thereby reducing the unit to unit variance related to kinematic user experience associated with the magnetic latch mechanism.

These and other embodiments are discussed below with reference to FIGS. 1-14; however, those skilled in the art will readily appreciate that the detailed description given herein with respect to these figures is for explanatory purposes only and should not be construed as limiting.

FIG. 1 illustrates a computing device 100, in accordance with some embodiments. The computing device 100 is a laptop computer that includes a top portion 102 and a base portion 104. The top portion 102 can include operational components such as a display assembly, image sensors, audio device(s) (e.g., speaker, microphone, etc.), and the like. The display assembly can include a liquid crystal display (LCD) panel and backlight array, an organic light emitting diode (OLED) panel, a touch-sensitive surface, and the like. The base portion 104 can include operational components such as a processor, a volatile memory, a non-volatile storage device (e.g., solid state devices (SSD), hard disk drives (HDD), etc.), audio device(s), and the like. The base portion 104 can also include input devices such as a keyboard, touchpad, biometric sensors, and the like.

Each of the top portion 102 and the base portion 104 can include an enclosure that defines a cavity. The enclosure can be referred to as a housing, structural component, body, or the like. The operational components for each of the top portion 102 and the base portion 104 are included in the cavity and/or secured to the enclosure. The enclosure can include multiple structural members formed into an assembly using mechanical fasteners, pressure sensitive adhesive (PSA), epoxies, or some other assembly technique such as spot welding, ultrasonic welding, friction welding, interlocking features, and any other technically feasible techniques for assembling structural members to form an assembly. The structural members can be manufactured from metal (e.g., aluminum, steel, metal alloys, etc.), plastic polymers (e.g., polyethylene—PE, polyvinyl chloride—PVC, etc.), ceramics (e.g., glass, porcelain, etc.), or composites of the aforementioned materials.

In some embodiments, the computing device 100 includes at least one magnetic latch mechanism. As depicted in FIG. 1, the computing device 100 includes two magnetic latch mechanisms. A first element 110 of the magnetic latch mechanism is included in the top portion 102 of the computing device 100, and a second element 120 of the magnetic latch mechanism is included in the base portion 104 of the computing device 100. The first element 110 can be a magnetic array, and the second element 120 can be an attractor plate comprising a ferromagnetic material such as 400 series stainless steels, 41xx series steel alloys (commonly referred to as cromolyn steel), and other ferromagnetic alloys. It will be appreciated that, in some embodiments, the first element 110 can be provided in the base portion 104 of the computing device 100, and the second element 120 can be provided in the top portion 102 of the computing device 100.

The computing device 100 can be configured in a closed configuration or an open configuration. As depicted in FIG. 1, the computing device 100 is in an open configuration. As used herein, a closed configuration refers to a relative positioning of the top portion 102 and the base portion 104 such that the first element 110 is brought proximate the second element 120 to experience an attractive force between the first element 110 and the second element 120 that is above a threshold value. In contrast, an open configuration refers to a relative positioning of the top portion 102 and the base portion 104 such that the first element 110 is separated from the second element 120 to reduce the attractive force between the first element 110 and the second element 120 below a threshold value. In the case of a laptop computer, an open configuration refers to a relative angle between a top surface of an enclosure of the base portion 104 and a display surface of a display device included in the top portion 102 being above a first threshold angle (e.g., 30 degrees, 45 degrees, 75 degrees etc.), and a closed configuration refers to a relative angle between the top surface of an enclosure of the base portion 104 and a display surface of a display device included in the top portion 102 being below a second threshold angle (e.g., 20 degrees, 10 degrees, 2 degrees, etc.). In some cases, the first threshold angle and the second threshold angle can be equal such that the computing device 100 is either in a closed configuration or an open configuration based on a comparison of the relative angle to a particular threshold angle (e.g., 30 degrees).

In some embodiments, operation of the computing device 100 can be altered based on a determination of whether the computing device 100 is in an open configuration or a closed configuration. For example, a sensor in the base portion 104 of the computing device can detect a strength of a magnetic field generated by the first element 110 proximate a location of the sensor in the base portion 104. As the position of the first element 110 changes relative to the base portion 104, the sensor can detect related changes in the strength of the magnetic field proximate the sensor. A signal from the sensor can be transmitted to a processor, which adjusts the operation of the computing device 100. For example, in a closed configuration, the computing device 100 can be put into a low-power mode by power-gating, clock-gating, or adjusting an operating voltage or operating frequency of one or more components of the computing device 100.

Although the computing device 100 depicted in FIG. 1 is shown as a laptop computer, nothing in this detailed description should be construed as limiting the computing device 100 to a particular form factor such as a laptop computer. In other embodiments, the computing device 100 can take other forms such as a tablet computer, mobile phone, desktop computer, game console, television, set-top box, and the like. Any consumer electronic device or industrial device including at least one structural component, enclosure, or the like movable relative to a second structural component, enclosure, or the like can incorporate the magnetic latch mechanism disclosed herein.

Where the computing device 100 only has a single enclosure or housing, such as with many tablet computers or mobile phones, then the computing device 100 can be combined with an auxiliary device. One or more of the first element(s) 110 can be included in the computing device 100 and one or more of the second element(s) 120 can be included in the auxiliary device. The auxiliary device can be retained relative to the computing device 100, at least in part, based on an attractive force between the first element 110 and the second element 120. Examples of auxiliary devices can include, but are not limited to, modular camera assemblies, speakers, projectors, and input devices such as a keyboard, a stylus, or a trackpad/mouse. The auxiliary device can be attached to the computing device, at least magnetically, at a docking location and positioned in a "closed configuration" where the magnetic element in the computing device 100 is attracted to the corresponding magnetic element in the auxiliary device. For example, a stylus can be positioned on the side of a tablet device and retained against the tablet device, at least in part, by the attractive force between the magnetic elements.

Figure 2A:
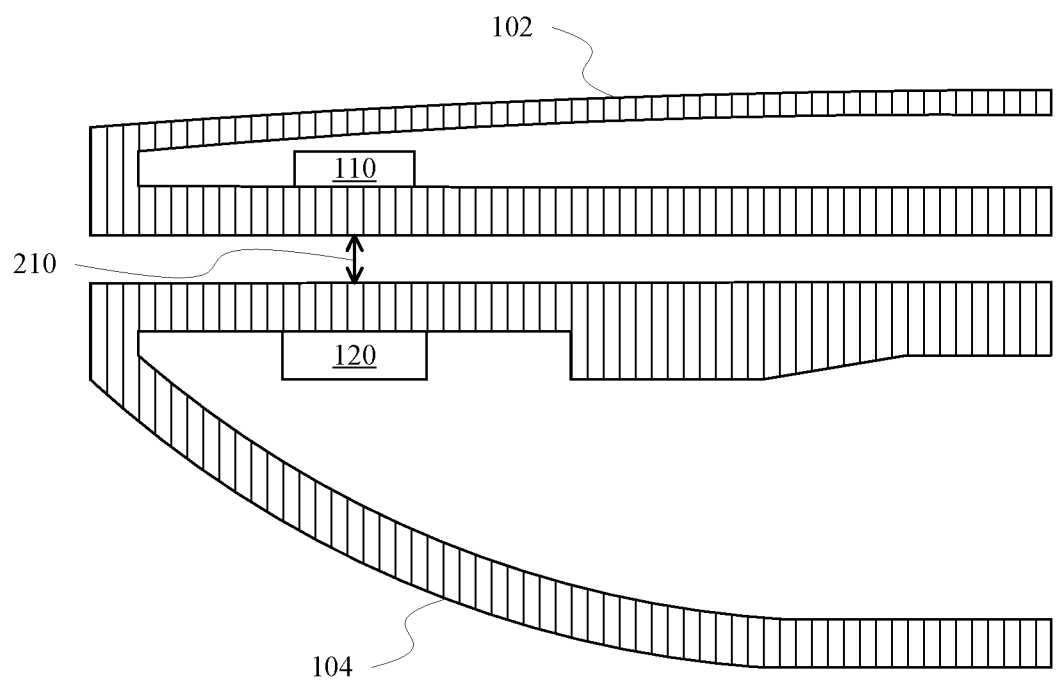
FIG. 2A shows a cross-section of the computing device of FIG. 1 in a closed configuration, in accordance with some embodiments.

FIG. 2A shows a cross-section of the computing device 100 of FIG. 1 in a closed configuration, in accordance with some embodiments. The first element 110 is located in a cavity of the enclosure for the top portion 102 of the computing device 100, and the second element 120 is located in a cavity of the enclosure for the base portion 104 of the computing device 100. The relative positions of the elements 110, 120 with the computing device 100 in the closed configuration results in an attractive force 210 that retains the computing device 100 in the closed configuration.

Figure 2B:
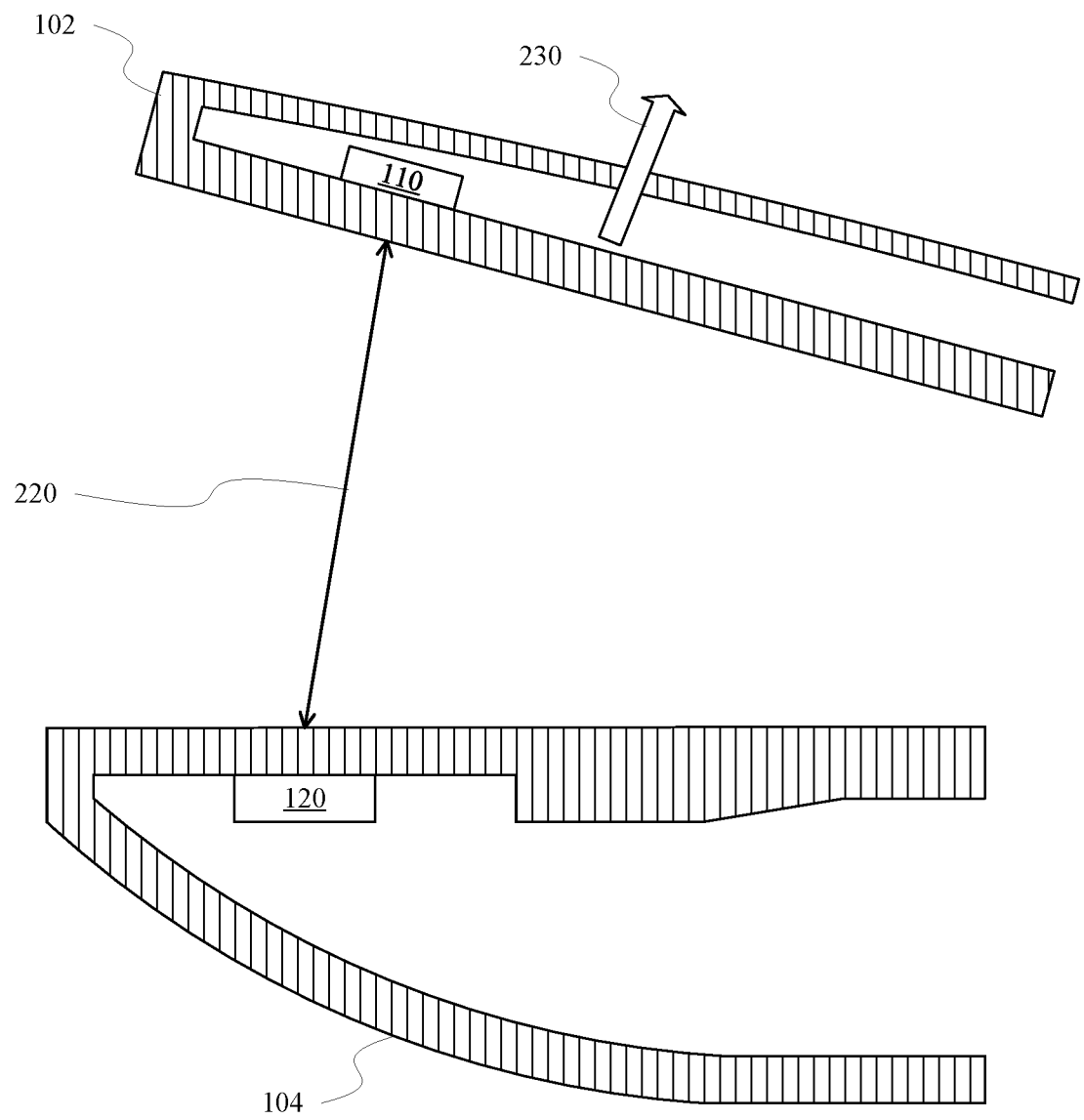
FIG. 2B shows a cross-section of the computing device of FIG. 1 in an open configuration, in accordance with some embodiments.

FIG. 2B shows a cross-section of the computing device 100 of FIG. 1 in an open configuration, in accordance with some embodiments. The top portion 102 of the computing device 100 has been moved away from the base portion 104 of the computing device 100 in a direction 230. The relative distance between the first element 110 and the second element 120 is increased and, as a result, the attractive force 220 is less than attractive force 210.

Figure 3A:
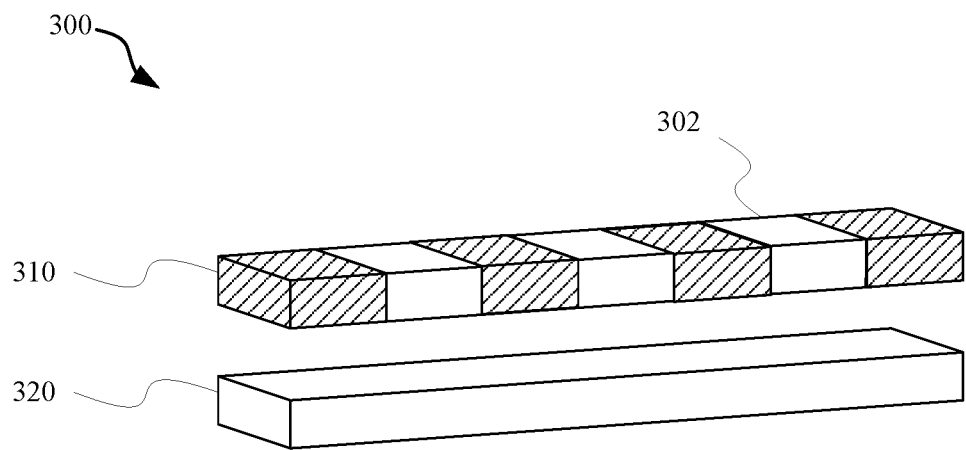
FIGS. 3A-3B illustrate a magnetic latching mechanism, in accordance with some embodiments.
Figure 3B:
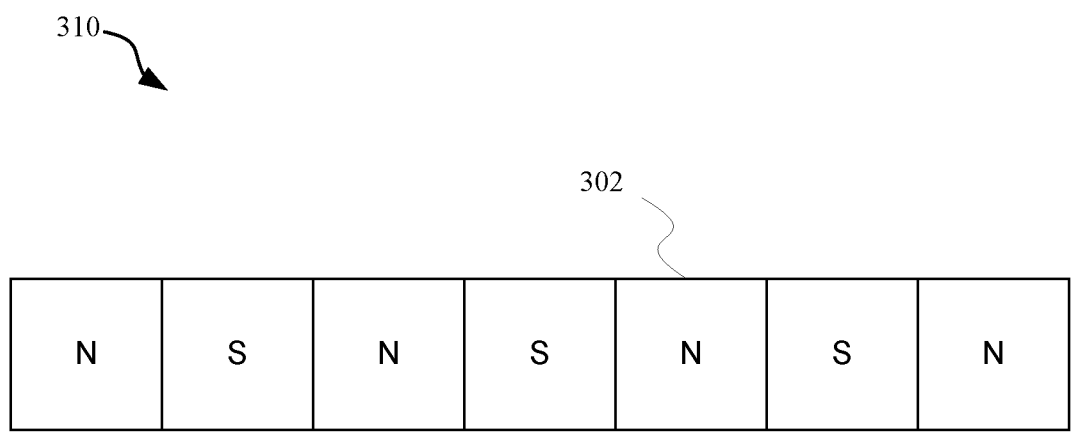

FIGS. 3A-3B illustrate a magnetic latching mechanism 300, in accordance with some embodiments. The magnetic latching mechanism 300 includes a magnetic array 310 and an attractor plate 320. The magnetic array 310 is a one-dimensional array of magnetic elements 302. In some embodiments, the magnetic elements 302 are permanent magnets affixed along a primary axis of the magnetic array 310. The orientation of the magnetic dipoles of the permanent magnets alternates along the primary axis of the one-dimensional array. For example, as depicted in FIG. 3B, an orientation of the magnetic dipoles of the permanent magnets along a top surface of the magnetic array 310 alternates between a north pole (N) and a south pole (S) pointed towards the top surface. The alternating polarities are arranged and sized to maximize the attractive force at a particular distance from the magnetic array 310, the distance corresponding to a distance between the magnetic array 310 and the attractor plate 320 in a closed configuration.

In some embodiments, the magnetic elements 302 are a plurality of magnetic zones created in a ferromagnetic substrate by magnetizing each of the magnetic zones to have a particular orientation of magnetic dipoles within the magnetic zone. Consequently, some magnetic zones are magnetized to have a north pole directed towards a top surface of the ferromagnetic substrate and other magnetic zones are magnetized to have a south pole directed towards the top surface of the ferromagnetic substrate. The orientation of magnetic dipoles of the magnetic zones can alternate along a primary axis of the magnetic array 310.

Figure 4A:
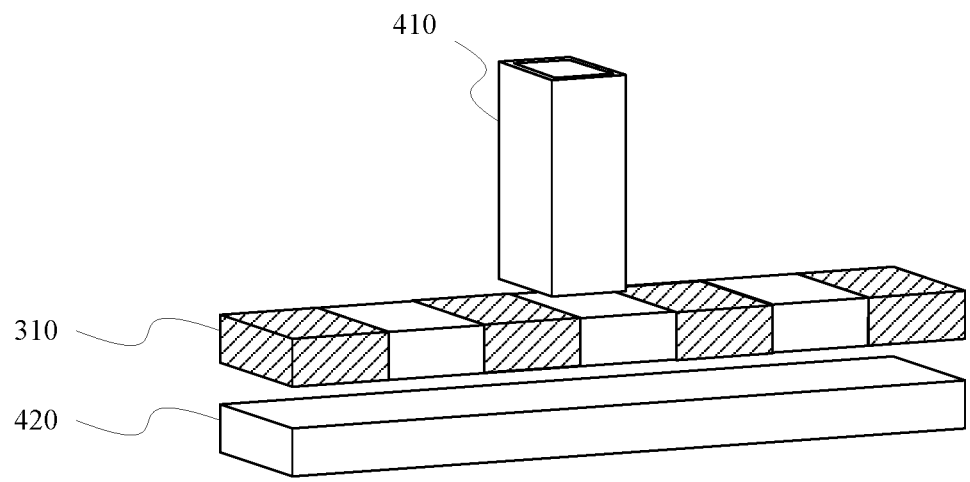
FIGS. 4A-4B illustrate a technique for selectively demagnetizing a portion of a magnetic array, in accordance with some embodiments.
Figure 4B:
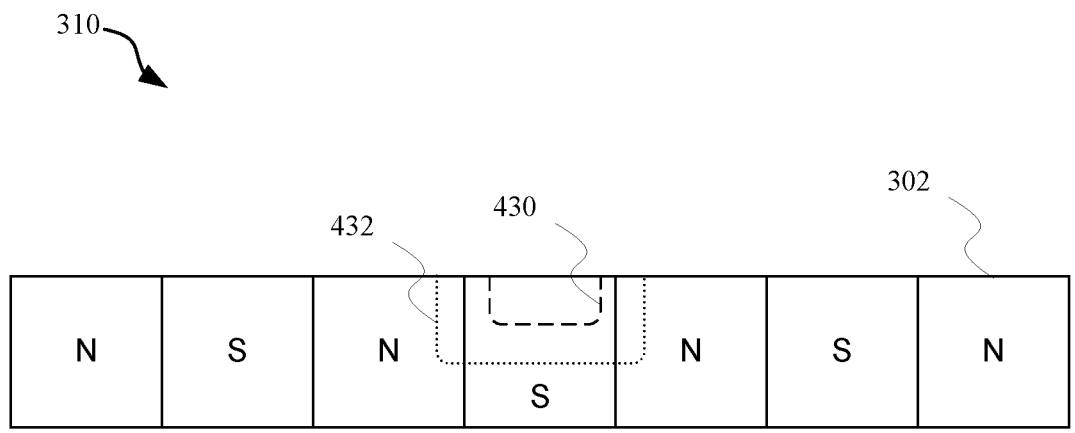

FIGS. 4A-4B illustrate a technique for selectively demagnetizing a portion of a magnetic array, in accordance with some embodiments. As depicted in FIG. 4A, a demagnetizing element 410 can be brought in proximity to the magnetic array 310 of the magnetic latching mechanism 300. In some embodiments, the demagnetizing element 410 is a wire coil wrapped around a ferromagnetic core, such as an iron or steel core. In other embodiments, the demagnetizing element 410 can be any technically feasible device capable of creating a magnetic flux proximate the demagnetizing element 410.

A magnetic shunt 420 is, optionally, placed opposite the demagnetizing element 410 to absorb magnetic flux generated by the demagnetizing element 410. The magnetic shunt 420 can be, e.g., a ferromagnetic material such as steel. The demagnetizing element 410 is excited to generate a magnetic field, which is utilized to demagnetize at least a portion of one or more magnetic elements 302 in the magnetic array 310, which is positioned between the demagnetizing element 410 and the optional magnetic shunt 420.

As depicted in FIG. 4B, a portion of a first magnetic element 302 is demagnetized to form a demagnetized zone 430. The size of the demagnetized zone 430 can be controlled by the size and structure of the demagnetizing element 410 and the relative position of the demagnetizing element 410 to the magnetic array 310. It will be appreciated that the demagnetized zone 430 is characterized by complete demagnetization of the magnetic material within the zone, regardless of the coercivity of the magnetic material and an initial strength of magnetization of the magnetic material prior to being demagnetized. As a result, the strength of the magnetic field generated by the demagnetizing element should be sufficient to ensure complete demagnetization of the magnetic material within the demagnetized zone 430. Consequently, the strength of the magnetic field generated by the demagnetizing element should be selected to completely demagnetize magnetic material within the demagnetized zone 430 having a maximum coercivity. The coercivity of the magnetic material will affect a size or width of a transition zone around the perimeter of the demagnetized zone, as will be discussed in more detail below. The strength of the attractive force 210 of the magnetic latching mechanism 300 can be tuned by changing the size or number of the demagnetized zones 430 in the magnetic array 310.

For example, where the magnetic array 310 includes seven magnetic elements 302 having alternating polarities, demagnetizing a portion of one or more magnetic elements 302 can be used to reduce the strength of the attractive force 210. Where the magnetic elements 302 are fully magnetized (e.g., fully saturated) as assembled, the attractive force 210 can then be tuned to reduce the attractive force 210 to within a pre-defined tolerance of a target force. Calibration of a loose tolerance magnetic array can reduce the expense of the magnetic latching mechanism 300 by not requiring precise control of the magnetic strength, coercivity, or other characteristic of the magnetic material used to manufacture the magnetic array 310 by a supplier. The loose tolerance magnetic latching mechanism 300 can instead be calibrated after assembly in an electronic device to adjust the attractive force 210 down to match a designed target force.

Furthermore, the strength of the attractive force can be adjusted by simply moving the demagnetizing element 410 to a particular position relative the magnetic array 310 and then exciting the demagnetizing element 410 with a demagnetization pulse to completely demagnetize a corresponding portion of one or more magnetic elements 302 in the magnetic array 310. By moving the demagnetizing element 410 in a direction perpendicular to a longitudinal axis of the magnetic array 310, the size of the resulting demagnetized zone 430 can be made larger or smaller, which will affect the strength and shape of the cumulative magnetic field produced by the number of magnetic elements 302 in the magnetic array 310.

It will be appreciated that the demagnetizing element 410 can demagnetize a different magnetic element 302 of the magnetic array 310 by: indexing the demagnetizing element 410 to a different location along a primary axis (e.g., a longitudinal axis) of the magnetic array 310 proximate a different magnetic element 302, and exciting the demagnetizing element 410 using a demagnetization pulse at the different location. Alternately, multiple demagnetizing elements 410 can be placed within a calibration assembly and used to demagnetize multiple magnetic elements 302 of the magnetic array 310 simultaneously without indexing the demagnetizing elements 410 to a new location along the primary axis of the magnetic array 310.

It will also be appreciated that the demagnetizing element 410 can extend over more than one magnetic element 302 in the magnetic array 310, such that the demagnetized zone 430 can extend over multiple magnetic elements 302. As will be discussed in more detail below, the demagnetization pulse can oscillate in polarity such that a single pulse can demagnetize portions of adjacent magnetic elements 302 having different polarity.

It will be appreciated that the demagnetization pulse causes the portion of the magnetic element 302 within the demagnetized zone 430 to be demagnetized. Demagnetized means that the magnetic dipoles within the material of the demagnetized zone 430 are randomly arranged such that a resulting magnetic field of the material in the demagnetized zone is approximately zero. This can be referred to as a null magnetic field. However, the magnetic field generated by the demagnetizing element 410 cannot be controlled in a manner that creates a perfect boundary between the fully magnetized portions of the magnetic elements 302 and the demagnetized zone 430. In practice, the operation to create the demagnetized zone 430 will create a transition zone 432 surrounding the demagnetized zone 430 where the magnetic element(s) 302 are partially demagnetized. The material in the transition zone 432 is only partially demagnetized because the strength of the magnetic field at a distance from the demagnetizing element 410 within the transition zone 432 is not sufficient to fully demagnetize the material within the transition zone 432.

Outside of the transition zone 432, the magnetic field is reduced to the point where the fluctuating magnetic field is insufficient to affect the magnetization of the magnetic elements 302. If the magnitude of the magnetic field is below a threshold value, then the magnetic dipoles in the material of the magnetic elements 302 will not re-align. The threshold value is related to a coercivity of the material, which is a measurement of the ability of a ferromagnetic material to resist demagnetization in the presence of an external magnetic field. Ideally, the transition zone 432 will be minimized in various ways, including applying a short, high frequency demagnetization pulse to the demagnetizing element 410 and utilizing a conductive mask between the demagnetizing element 410 and the magnetic array 310.

Figure 5A:
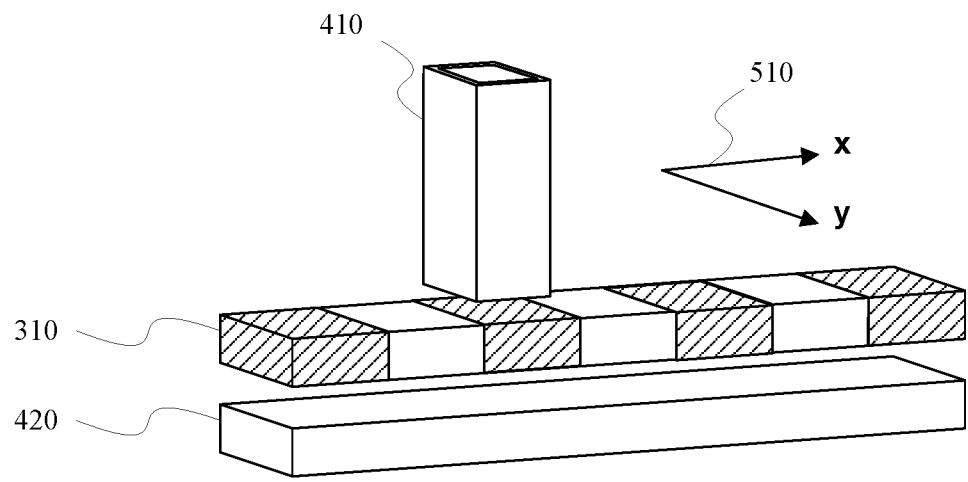
FIGS. 5A-5B illustrate a technique for calibrating a magnetic latching mechanism, in accordance with some embodiments.
Figure 5B:
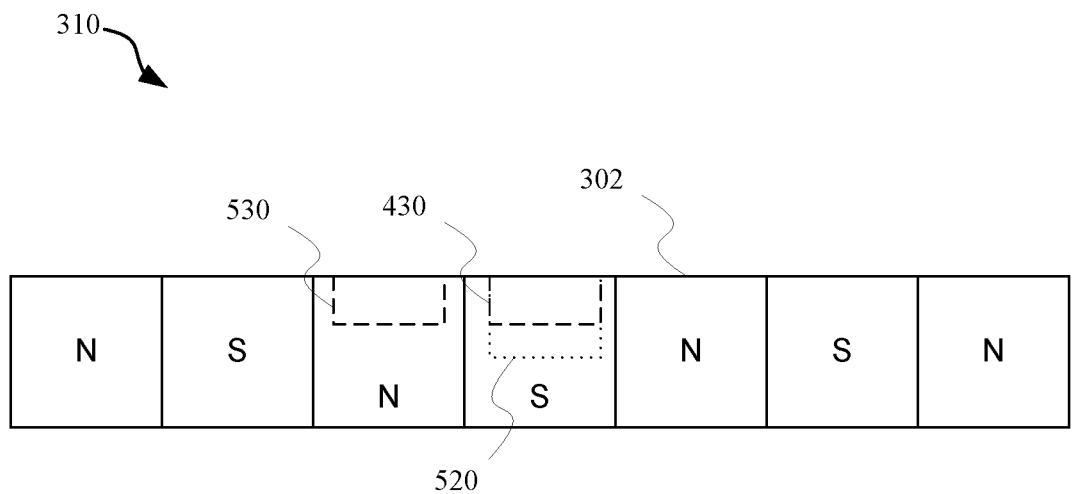

FIGS. 5A-5B illustrate a technique for calibrating a magnetic latching mechanism, in accordance with some embodiments. As depicted in FIG. 5A, the position of the demagnetizing element 410 can be adjusted within a two-dimensional coordinate system 510. The magnetic array 310 is aligned along an x-axis of the coordinate system 510. The demagnetizing element 410 and the magnetic shunt 420 can be moved relative to the magnetic array 310 along a y-axis of the coordinate system 510 to increase or decrease a size of the demagnetized zone 430 in a particular magnetic element 302 of the magnetic array 310.

As depicted in FIG. 5B, the change in relative position of the demagnetizing element 410 along a secondary axis (e.g. the y-axis of coordinate system 510) orthogonal to the primary axis of the magnetic array 310 changes the size of the demagnetized zone in a magnetic element 302, e.g., from demagnetized zone 430 to demagnetized zone 520. The increase in size is realized by moving the demagnetizing element 410 in the y-axis direction such that more of a footprint of the demagnetizing element 410 overlaps the magnetic element 302 under the demagnetizing element 410. The position of the demagnetizing element 410 can be used to control the size of the demagnetized zone and, therefore, the degree to which the attractive force 210 is reduced.

In addition, the demagnetizing element 410 can be indexed along the primary axis to demagnetize a different magnetic element 302 of the magnetic array 310. Consequently, after the demagnetized zone 430 or 520 is formed in a first magnetic element 302, the demagnetizing element 410 can be indexed to a second magnetic element 302 to form demagnetized zone 530. The size of demagnetized zone 530 can be the same as or different from either of demagnetized zones 430 and 520. Again, in some embodiments, a calibration assembly can include multiple demagnetizing elements 410 arranged adjacently such that multiple demagnetized zones can be formed simultaneously.

Figure 6:
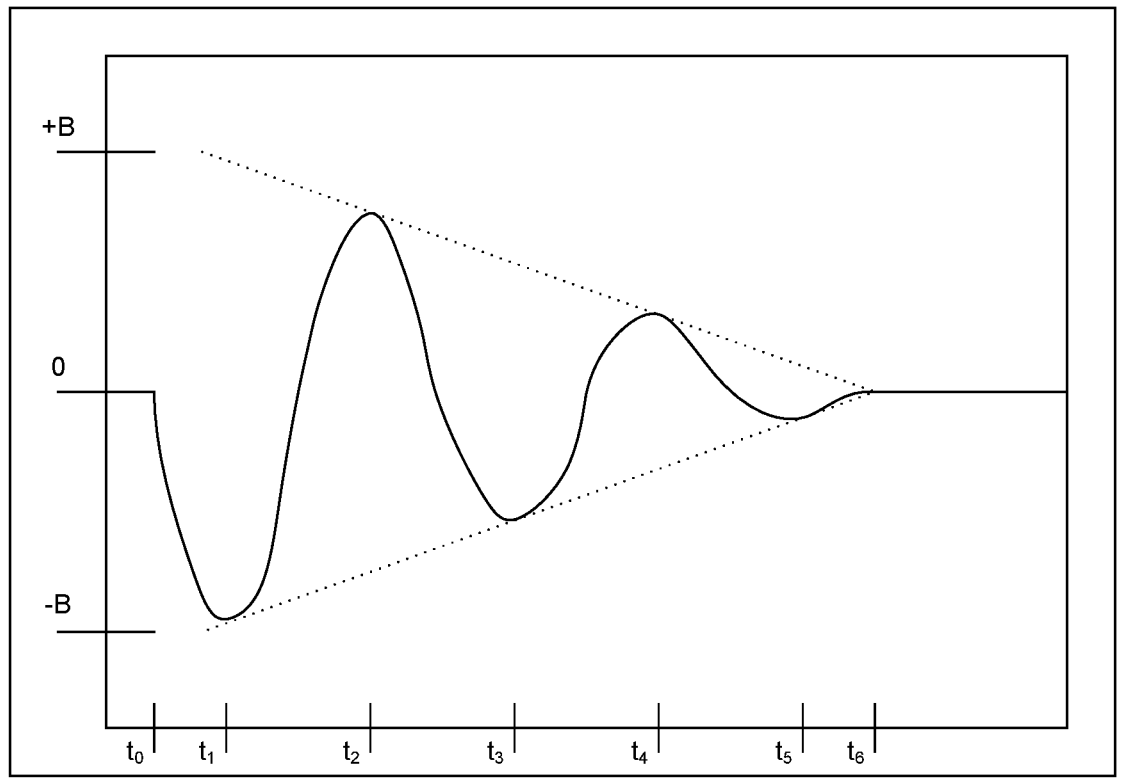
FIG. 6 illustrates a graph of a demagnetization pulse, in accordance with some embodiments.

FIG. 6 illustrates a graph 600 of a demagnetization pulse, in accordance with some embodiments. The graph 600 plots a strength of a magnetic field generated by the demagnetizing element 410 at a location proximate the demagnetizing element 410. In some embodiments, where the demagnetizing element 410 is a copper wire wound around a ferromagnetic core, the demagnetizing element 410 is excited by passing a current through the copper wire to generate the magnetic field.

In some embodiments, the demagnetization pulse is generated by an alternating current source that decays over time. As depicted in FIG. 6, the current is driven through the demagnetizing element 410 in a first direction between time $t_0$ and time $t_1$. The magnetic field reaches a maximum negative strength at time $t_1$, which will cause magnetic dipoles in the ferromagnetic substrate of the magnetic element 302 within the demagnetization zone to align with the externally applied magnetic field. The current is reversed and driven through the demagnetizing element 410 in a second direction between time $t_1$ and time $t_2$. The magnetic field reaches a maximum positive strength at time $t_2$. The maximum positive strength can be less than the maximum negative strength and, as a result, at least some magnetic dipoles in the ferromagnetic substrate of the magnetic element 302 within the demagnetization zone re-align with the externally applied magnetic field in the opposite direction. The current is alternately driven in the first direction and the second direction, decaying in amperage, over a pulse period (e.g., time $t_0$ to time $t_6$) where the alternating current is reduced to zero amps. The decaying strength of the magnetic field during each cycle randomly orients the magnetic dipoles within the demagnetization zone such that the resulting magnetic field is zero or virtually zero after demagnetization.

It will be appreciated that the maximum strength of the magnetic field generated by the alternating current source should be sufficient to overcome the initial magnetization of the magnetic elements in the magnetic array 310. Again, the magnetic array 310 can be provided by a vendor with high unit to unit variance of the magnetic properties of the magnetic elements 302. For example, the coercivity of the magnetic material can vary significantly between units. The maximum strength of the magnetic field generated by the alternating current source should be sufficient to re-align the magnetic dipoles within the magnetic material based on the expected distribution of a coercivity property among a batch of magnetic arrays 300 supplied by a vendor. It will be appreciated that the strength of the magnetic field should also not be significantly stronger than necessary because the goal of the calibration routine is to establish a demagnetized zone of a specified size in order to reduce a magnitude of the attractive force by a calculated amount. Overpowering the demagnetizing element would increase the size of the demagnetized zone and possibly demagnetize the entire magnetic array.

It will be appreciated that the alternating current will initially ramp up to the maximum current over a number of cycles before beginning to decay. Furthermore, the frequency of the alternating current should be selected as appropriate. In some embodiments, the frequency of the alternating current will be approximately 60 Hz and the pulse time will be between one second and three seconds. In exemplary embodiments, a short, high frequency pulse can decrease the size of the transition zone around the perimeter of the demagnetized zone. Creating a well defined demagnetized zone with a minimized or reduced transition zone can increase the accuracy of the calibration process. Consequently, in some embodiments, the frequency of the alternating current can be increased above 60 Hz, such as 200 Hz, and the pulse time can be decreased to less than one second, such as 800 milliseconds. In some cases, frequencies can be even higher, into the kHz range. Higher frequencies can be utilized with shorter pulse times, increasing the speed of demagnetization. However, it will be appreciated that frequencies above a particular threshold will result in less effective demagnetization as the external magnetic field is switching too fast for the magnetic dipoles within the magnetic material to re-align with the external magnetic field. Furthermore, shorter pulse times result in fewer cycles of the external magnetic field during demagnetization and an increased rate of decay of the strength of the external magnetic field, leading to less random alignment within the magnetic material, which can cause a residual magnetic field to remain after demagnetization. Therefore, care should be taken to select the appropriate characteristics of the demagnetization pulse for a given structure and distribution of properties of the magnetic array.

Figure 7A:
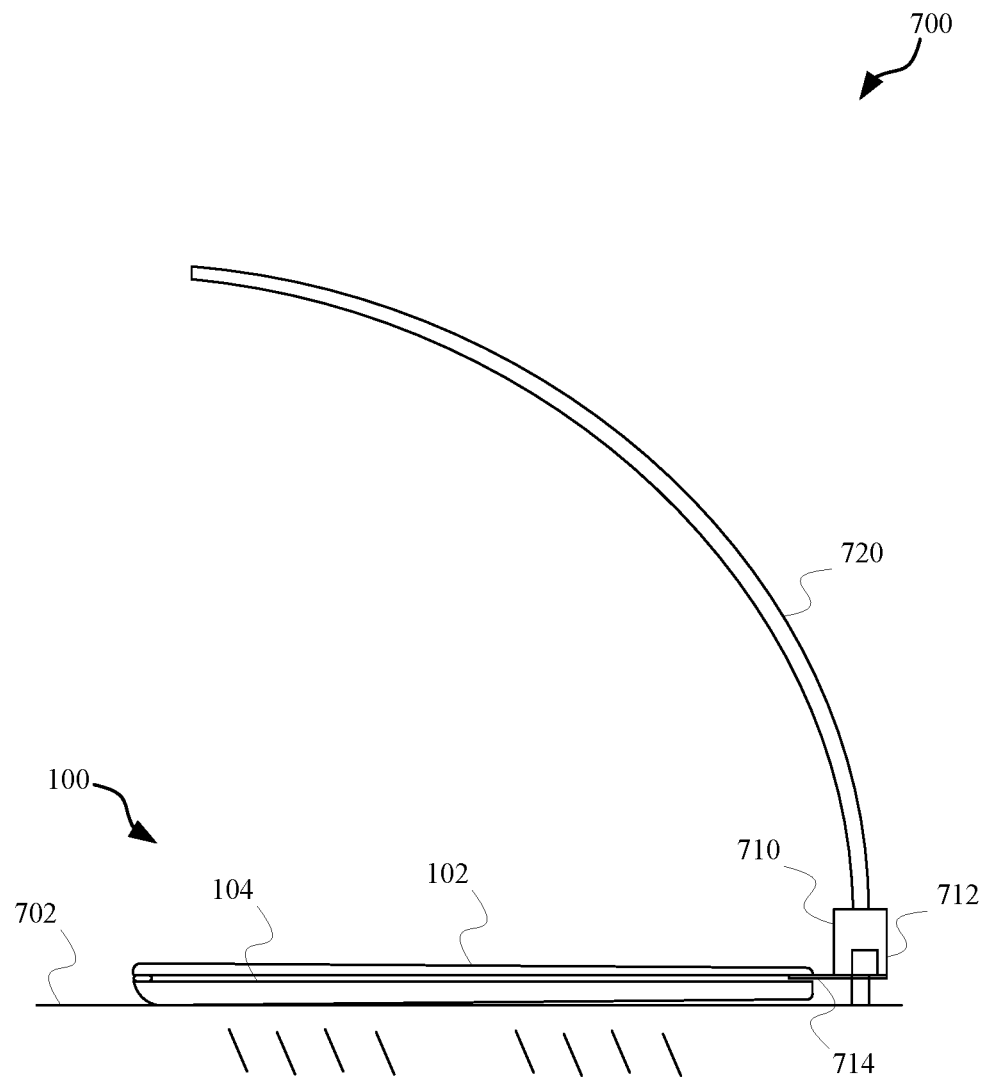
FIGS. 7A-7C illustrate a system for calibrating a magnetic latch mechanism in a computing device, in accordance with some embodiments.
Figure 7B:
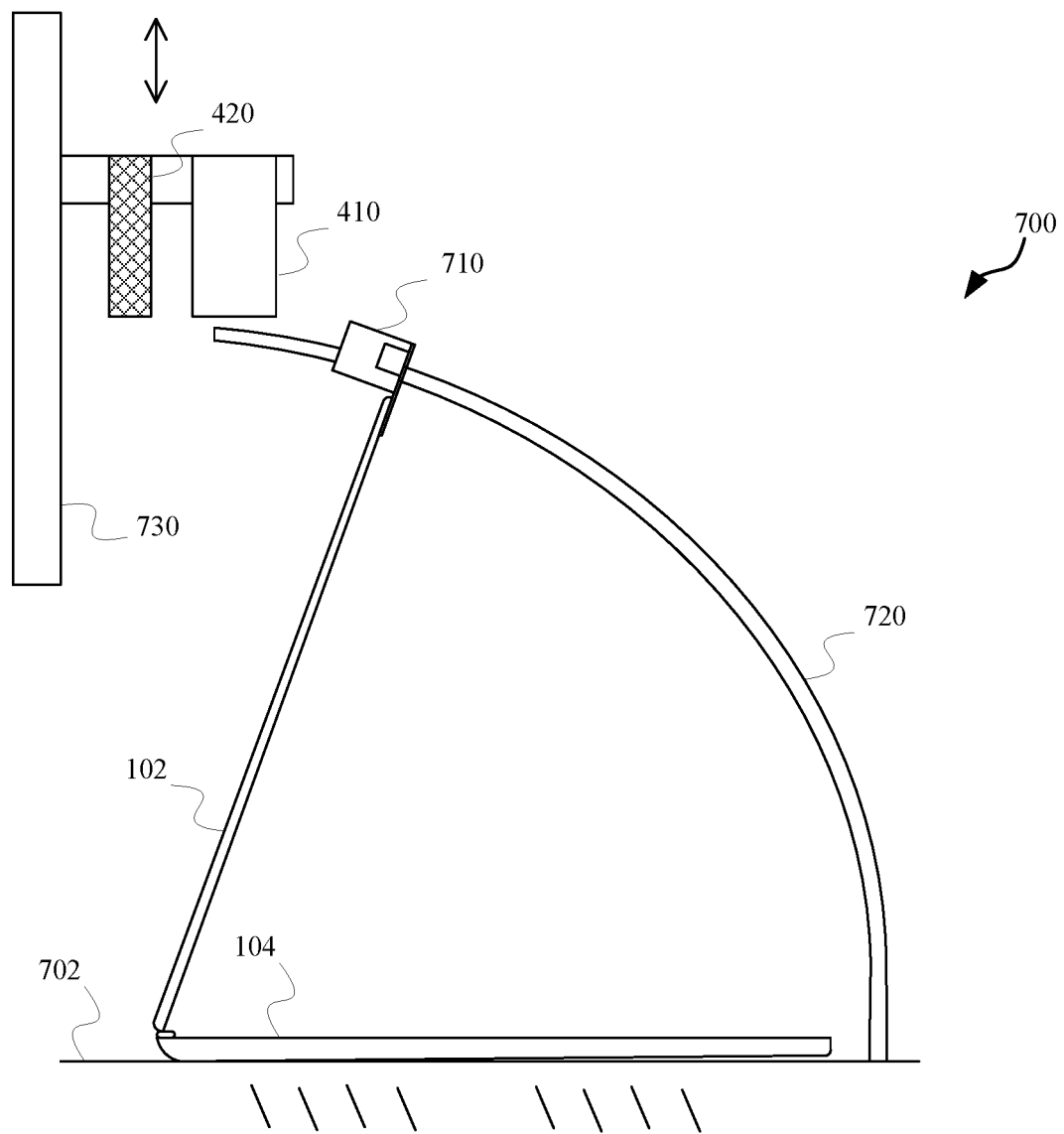
Figure 7C:
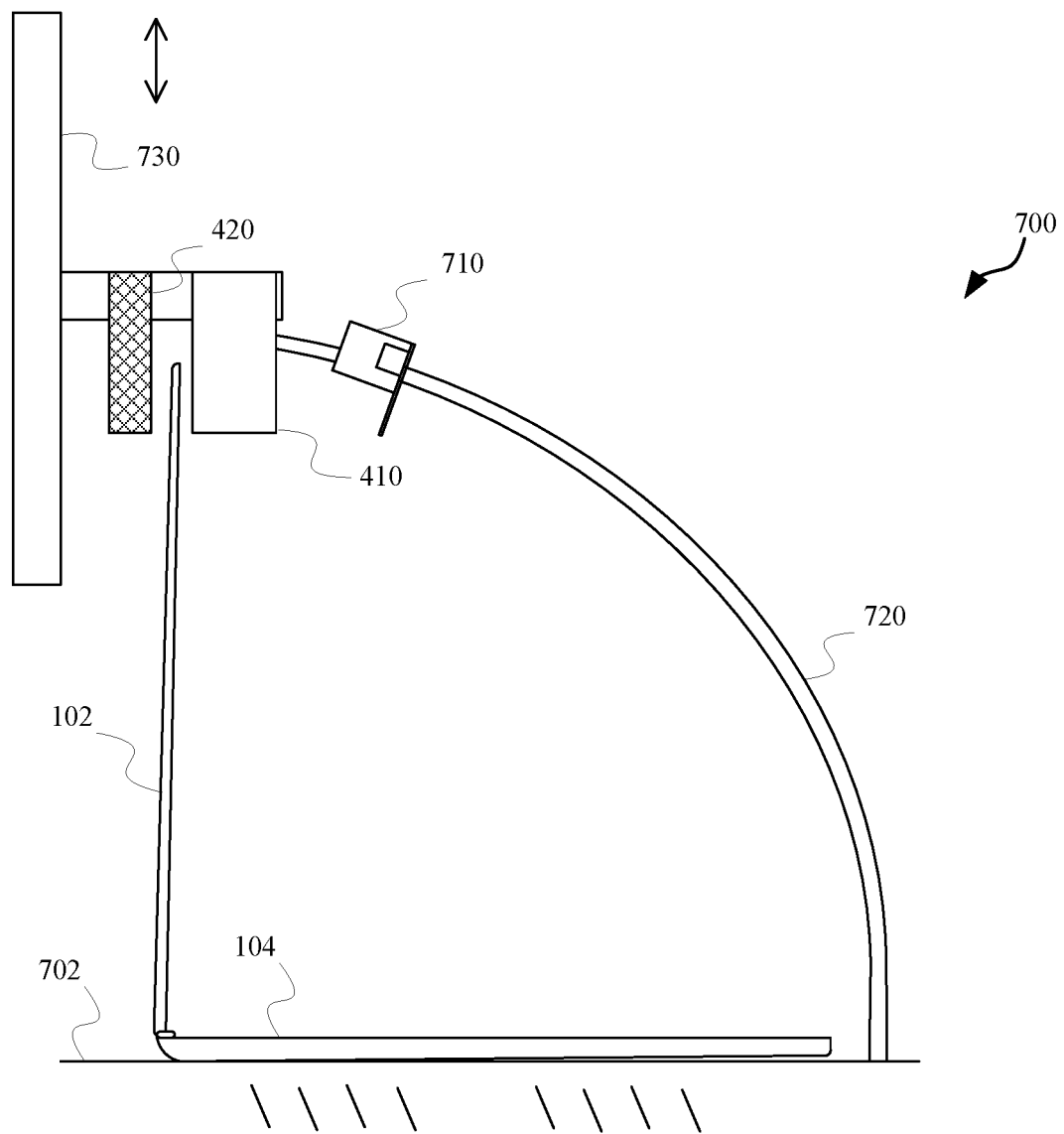

FIGS. 7A-7C illustrate a system 700 for calibrating a magnetic latch mechanism in a computing device 100, in accordance with some embodiments. As depicted in FIG. 7A, the computing device 100 rests on a surface 702 in a closed configuration. A robot 710 includes a load cell 712 as well as a member 714 configured to be inserted between the top portion 102 and the base portion 104 of the computing device 100. The load cell 712 measures a force on the member 714 as the robot 710 moves along a track 720, which causes the member 714 to rotate the top portion 102 of the computing device 100 from the closed configuration to the open configuration.

As depicted in FIG. 7B, the robot 710 has moved along the track 720, rotating the top portion 102 of the computing device 100 away from the base portion 104 of the computing device. The top portion 102 of the computing device 100 is moved to an open configuration where the front edge of the top portion 102 of the computing device 100 is proximate a calibration assembly 730. The calibration assembly 730 includes one or more demagnetizing elements 410 and, optionally, one or more magnetic shunts 420. The magnetic shunt(s) 420 and demagnetizing element 410 are separated by a distance sufficient to tolerate insertion of at least a portion of the magnetic array 310 of the latch mechanism 300 included in the computing device 100 between the magnetic shunt 420 and the demagnetizing element 410.

The robot 710 is configured to measure an attractive force during the motion from an initial position engaging the top portion 102 in the closed configuration to a final position in the open configuration. The attractive force can be sampled at a specific position along the track 720 that ensures the hinge is moving at a particular speed and the magnetic array 310 and attractor plate 320 are a particular distance of separation.

As depicted in FIG. 7C, the calibration assembly 730 engages the top portion 102 of the computing device 100 in order to calibrate the magnetic latch mechanism of the computing device 100. In some embodiments, the demagnetizing element 410 is configured to demagnetize at least a portion of one or more magnetic elements 302 of the magnetic array 310. The calibration assembly 730 moves to a location relative the magnetic array 310, the location being determined based on the attractive force measured by the load cell 712. In some embodiments, the location is determined as a relative position between the demagnetizing element 410 and the magnetic array 310 along a secondary axis that is orthogonal to the primary axis of the magnetic array 310. The relative position is proportional to a magnitude of a difference between the attractive force measured by the load cell 712 and a target force.

Once the calibration assembly 730 has positioned the demagnetizing element 410 at the location, the demagnetizing element 410 is excited by the demagnetization pulse to at least partially demagnetize one or more magnetic elements 302 of the magnetic array 310. The demagnetization pulse is an alternating current that decreases in magnitude over a period of time. The size of the demagnetized zone in the one or more magnetic elements 302 is selected to adjust the attractive force experienced when opening the computing device 100.

In some embodiments, the robot 710 returns the computing device 100 to the closed configuration and repeats the steps shown in FIGS. 7A and 7B to measure the attractive force again after adjusting the size of one or more demagnetized zones of the magnetic array 310. The re-measured attractive force is compared to the target force. If the difference between the attractive force and the target force is above a threshold value, indicating the attractive force is out of pre-defined tolerances, the calibration assembly is positioned relative the magnetic array 310 at a new location based on a difference between the attractive force and the target force. The delta between the first location and the second location can be proportional to the difference between the attractive force and the target force. The demagnetizing element 410 is then excited again with the demagnetization pulse to increase the size of the demagnetized zone within the magnetic element 302 of the magnetic array 310. These steps can be repeated a number of times for a particular magnetic element 302 of the magnetic array 310 or for different magnetic elements 302 of the magnetic array 310.

It will be appreciated that the robot can take different forms than the robot 710 shown in FIGS. 7A-7C. For example, the robot can be a multi-axis robot configured with a gripper tool at the end of a robotic arm configured to open the laptop computer. In such embodiments, the multi-axis robot replaces the robot 710 and track 720 shown in FIGS. 7A-7C. The robot can take many forms as long as the components of the robot are sufficient to operate the magnetic latch mechanism and measure the attractive force associated with the magnetic latch mechanism.

Figure 8:
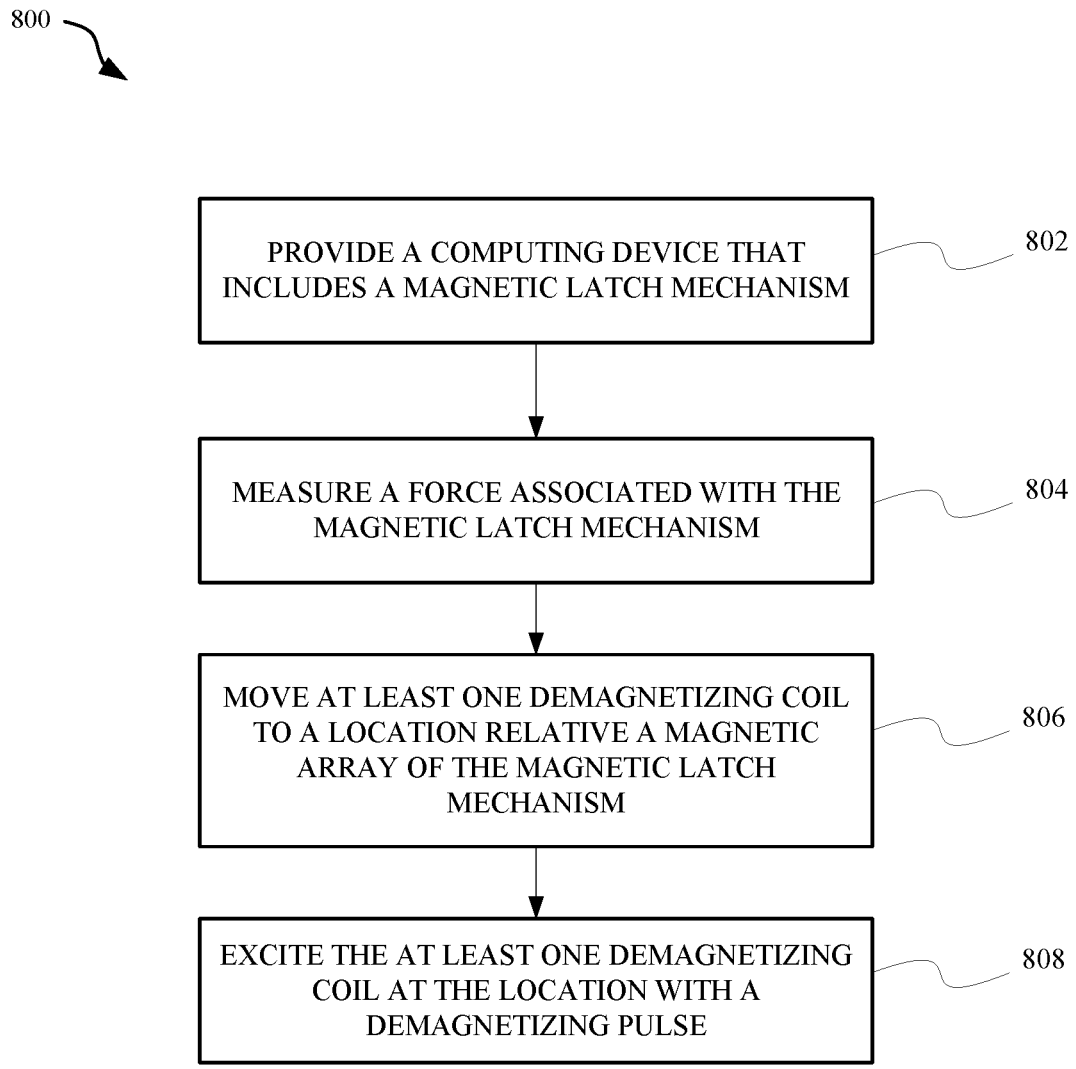
FIG. 8 illustrates a flowchart of an exemplary method to calibrate a magnetic latching mechanism, in accordance with some embodiments.

FIG. 8 illustrates a flowchart of an exemplary method 800 to calibrate a magnetic latching mechanism, in accordance with some embodiments. The method 800 may be implemented by hardware or software, or some combination of hardware and software including, although not limited to, a processor configured to execute instructions that cause the method steps to be performed.

At 802, a computing device is provided that includes a magnetic latch mechanism. The computing device includes a first portion and a second portion, moveable relative to the first portion. In some embodiments, the first portion includes a magnetic array and the second portion includes an attractor plate. The magnetic array is located proximate the attractor plate when the computing device is in a closed configuration. In some embodiments, the computing device is a laptop computer, the magnetic array is included in a top portion of the laptop computer, and the attractor plate is included in a base portion of the laptop computer.

In other embodiments, the computing device is a tablet computer, the tablet computer includes an aluminum housing secured to a display assembly. The tablet computer is associated with an auxiliary device such as a stylus or other input device that is wirelessly connected to the tablet computer. A magnetic array is included within an aluminum enclosure of the tablet computer and an attractor plate is included in an aluminum housing for the auxiliary device (e.g., input device) connected wirelessly to the tablet computer.

At 804, a force associated with the magnetic latch mechanism is measured. The force can be an attractive force measured between a magnetic array 310 and an attractor plate 320 of the magnetic latch mechanism when the computing device is opened or the magnetic array 310 is otherwise moved away from the attractor plate 320. In some embodiments, the force is measured as a force sensed by a load cell at a particular point in a path of a robot configured to operate the magnetic latch mechanism.

At 806, at least one demagnetizing element is moved to a location relative the magnetic array. The location is determined based on the force. In some embodiments, a distance that the demagnetizing element 410 overlaps a magnetic element 302 of the magnetic array 310 is proportional to a difference between the measured force and a target force.

At 808, the at least one demagnetizing element at the location is excited with a demagnetization pulse to at least partially demagnetize one or more magnetic elements of the magnetic array. The demagnetization pulse generates a demagnetized zone in a corresponding magnetic element 302 of the magnetic array 310 overlapped by the demagnetizing element 410.

The steps described at 804 to 808 can be repeated one or more times to further reduce the attractive force at a finer granularity.

Figure 9:
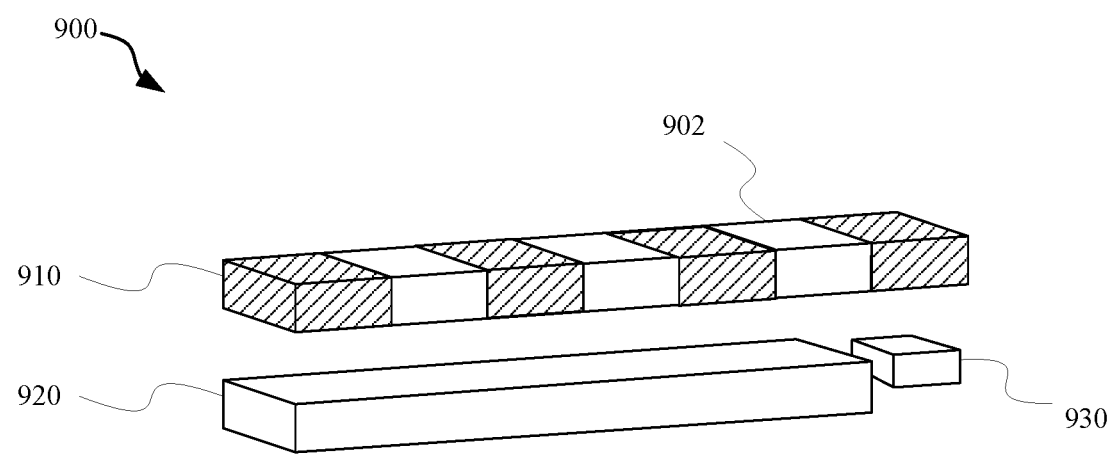
FIG. 9 illustrates a magnetic latching mechanism, in accordance with some embodiments.

FIG. 9 illustrates a magnetic latching mechanism 900, in accordance with some embodiments. The magnetic latch mechanism 900 includes a magnetic array 910 and an attractor plate 920. A length of the magnetic array 910 along a primary axis is greater than a corresponding length of the attractor plate 920. The magnetic latch mechanism 900 further includes a sensor 930 placed proximate the attractor plate 920 and configured to detect when the magnetic latch mechanism 900 is configured in a closed configuration. In some embodiments, the magnetic array 910 is included in the top portion 102 of the computing device 100, and the attractor plate 920 and sensor 930 are included in the bottom portion 104 of the computing device 100.

The sensor 930 can be a Hall Effect sensor, a magnetometer, MEMS (microelectromechanical systems) sensors, and the like. The sensor 930 can be utilized to detect a location of the top portion 102 of the computing device 100 based on a strength of the detected magnetic field. In some embodiments, the sensor 930 detects whether the computing device 100 is in an open configuration or a closed configuration based on a comparison of a sensed magnetic field with a threshold value. The magnetic field being greater than the threshold value indicates the computing device 100 is in a closed configuration, and the magnetic field being less than the threshold value indicates the computing device 100 is in an open configuration.

The length of the attractor plate 920 is reduced to expose more of the magnetic flux from at least one magnetic element 902 of the magnetic array 910 to the sensor 930. Reducing the length of the attractor plate 920 will also reduce the attractive force associated with the magnetic latch mechanism 900. Therefore, the magnetic latch mechanism 900 is calibrated with the shorter attractor plate 920 to reduce the attractive force within a pre-defined tolerance of a target force.

Figure 10A:
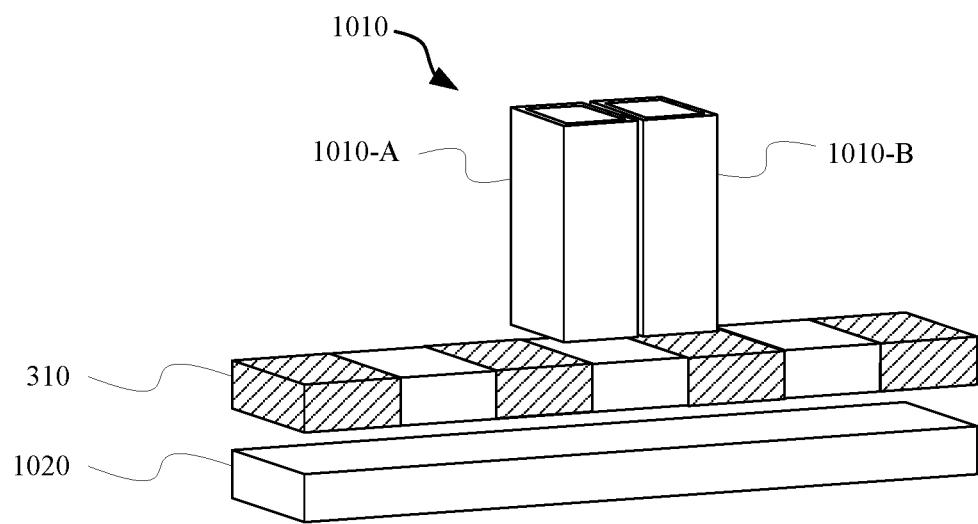
FIGS. 10A-10B illustrate a technique for selectively demagnetizing a portion of a magnetic array, in accordance with some embodiments.
Figure 10B:
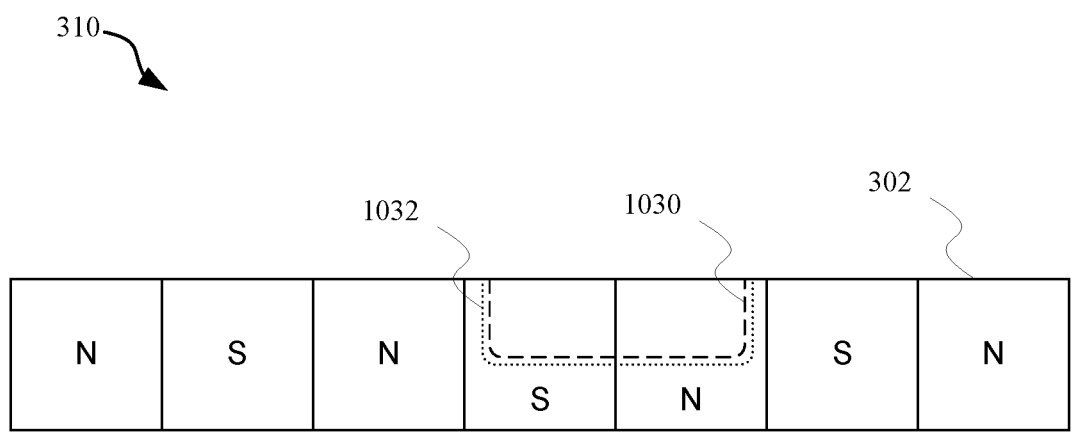

FIGS. 10A-10B illustrate a technique for selectively demagnetizing a portion of a magnetic array, in accordance with some embodiments. As depicted in FIG. 10A, a demagnetizing element 1010 can be brought in proximity to the magnetic array 310 of the magnetic latching mechanism 300. A magnetic shunt 1020 can also be placed proximate the magnetic array 310, opposite the demagnetizing element 1010. In some embodiments, the demagnetizing element 1010 includes a first demagnetizing coil 1010-A arranged adjacent a second demagnetizing coil 1010-B. The first demagnetizing coil 1010-A and the second demagnetizing coil 1010-B are configured to generate magnetic fields of opposite polarity.

In some embodiments, the demagnetization pulse comprises a current applied to the first demagnetizing coil 1010-A and an equal and opposite current applied to the second demagnetizing coil 1010-B. In some embodiments, the demagnetization pulse is an alternating current source that decays over time. The demagnetization pulse causes the demagnetizing element 1010 to generate a magnetic field that demagnetizes at least a portion of one or more magnetic elements 302 of the magnetic array 310. In some embodiments, the first demagnetizing coil 1010-A and the second demagnetizing coil 1010-B include a common conductor wound in an opposite direction around two separate and distinct ferromagnetic cores such that a current applied to the conductor winds clockwise around one coil and counter clockwise around the other coil, depending on the direction of the current.

Figure 11:
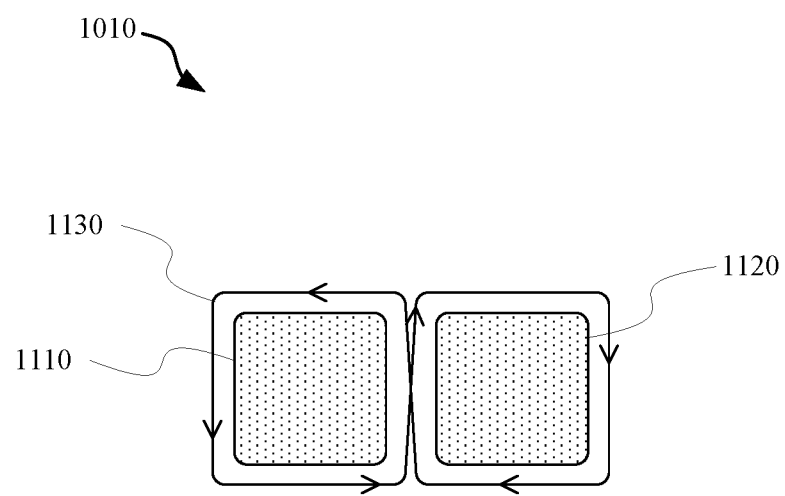
FIG. 11 illustrates the demagnetizing element of FIG. 10A, in accordance with some embodiments.

FIG. 11 illustrates the demagnetizing element 1010 of FIG. 10A, in accordance with some embodiments. As depicted in FIG. 11, the demagnetizing element 1010 includes a first core 1110 and a second core 1120. In some embodiments, the first core 1110 and the second core 1120 are formed of a ferromagnetic material. The ferromagnetic material can be iron, steel, nickel, cobalt, iron-cobalt, or some other ferromagnetic metal or alloy. A copper wire 1130 is wound around both the first core 1110 and the second core 1120, where each loop of the copper wire crosses at a zone disposed between the first core 1110 and the second core 1120 such that a current passing through the wire 1130 moves a first direction (e.g., counter clock-wise) around the first core 1110 and a second direction (e.g., clock-wise) around the second core 1120.

In other embodiments, the first core 1110 and the second core 1120 can be omitted. In other words, the wire 1130 can be wrapped around a core comprised of air or some other gas within the operating environment of the demagnetizing element 1010. In such embodiments, the wire 1130 can be wrapped around a mandrel, fixed by a resin or other constraining structure into a shape, and then removed from the mandrel leaving the wire coil. However, it will be appreciated that the magnetic field generated by a demagnetizing element 1010 having a ferromagnetic core will be stronger than a similar demagnetizing element 1010 without a core. Alternately, the core can be non-ferromagnetic, such as plastic, which provides structure for the coil but otherwise does not boost the strength of the magnetic field produced by the demagnetizing element 1010 as with a ferromagnetic core.

As described above, each loop of the wire can be wrapped around the first core 1110 and the second core 1120. However, in other embodiments, a first portion of the wire 1130 can be wrapped around the first core 1110 a number of times in a first direction, and then a second portion of the wire 1130 can be wrapped around the second core 1120 the same number of times in a second direction that is opposite the first direction. This type of arrangement may be easier to manufacture than wrapping both the first core 1110 and the second core 1120 together within each loop. However, by wrapping the cores 1110 and 1120 separately and then connecting the resulting coils, the first core 1110 will not be constrained relative to the second core 1120 by the wire 1130 and may require some additional structural component to constrain the location of the first core 1110 relative to the second core 1120.

In some embodiments, the size of the wire 1130 utilized within the first demagnetizing coil 1010-A and the second demagnetizing coil 1010-B can be reduced in order to try to minimize the size of the transition zone. By reducing the thickness of the wire 1130 the current passing through the wire 1130 is restricted to a tighter envelope surrounding the cores 1110 and 1120, which has beneficial results when comparing a size of a resulting transition zone within the magnetic array 310.

In other embodiments, the demagnetizing element 1010 can include more than two cores. For example, the demagnetizing element 1010 can include three cores, four cores, or more. The number of cores can match a number of magnetic elements 302 within the magnetic array 310 that are to be demagnetized during a demagnetizing operation. Alternatively, the demagnetizing element 1010 can be indexed to a new position along a primary axis of the magnetic array 310 to demagnetize additional magnetic elements 302 of the magnetic array 310. It will be appreciated that including more cores in the demagnetizing element 1010 can increase manufacturing throughput relative to indexing the demagnetizing element because additional cores can be energized simultaneously during a demagnetizing operation.

Returning now to FIG. 10B, a demagnetization pulse can be applied to the demagnetizing element 1010 in order to generate a demagnetized zone 1030 in the magnetic array 310. As depicted in FIG. 10B, the demagnetized zone 1030 can span multiple magnetic elements 302 of the magnetic array 310. The size of the demagnetized zone 1030 can depend on the size and arrangement of the demagnetizing element 1010 as well as the location of the demagnetizing element 1010 relative the magnetic array 310 when the demagnetization pulse is applied. Again, the demagnetization pulse should be configured such that the magnetic material within the demagnetized zone 1030 is completely demagnetized, independent of the unit to unit variation of the properties of the magnetic material. In other words, the demagnetization pulse should be sufficiently powerful and of a particular frequency to ensure that any magnetic material within the demagnetized zone 1030 having a coercivity up to a maximum coercivity will be completely demagnetized under operation of the demagnetizing element 1010.

It will be appreciated that by arranging a first demagnetizing coil 1010-A adjacent a second demagnetizing coil 1010-B, and energizing the coils such that the polarity of the first coil 1010-A is opposite the polarity of the second demagnetizing coil 1010-B, that the resulting magnetic field is significantly different from the magnetic field of the demagnetizing element 410 having a single coil. In some embodiments, the different arrangement can result in a much smaller transition zone 1032 when compared to the transition zone 432 shown in FIG. 4B.

Figure 12A:
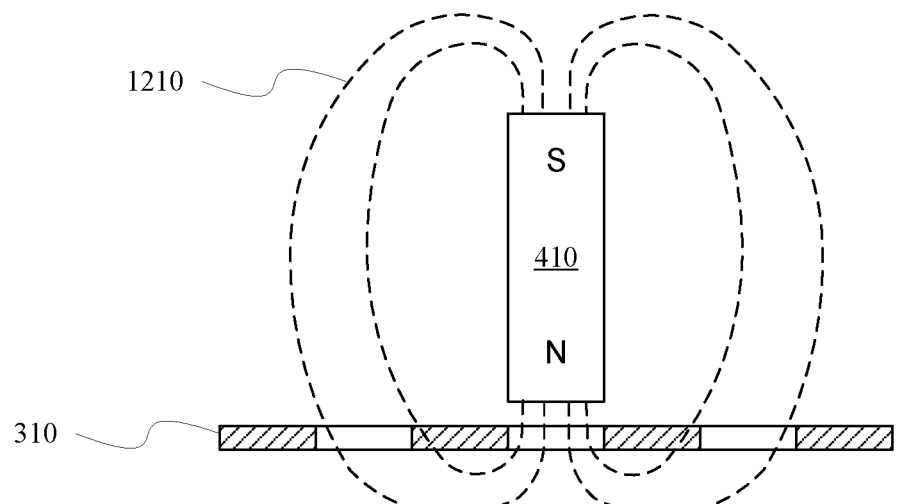
FIGS. 12A-12B illustrate the magnetic fields associated with different demagnetizing elements, in accordance with some embodiments.
Figure 12B:
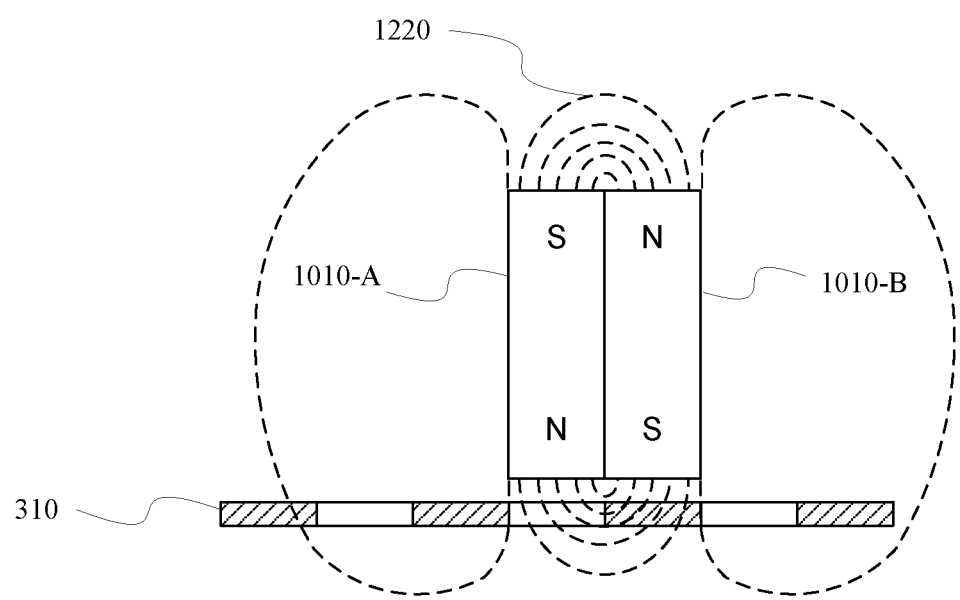

FIGS. 12A-12B illustrate the magnetic fields associated with different demagnetizing elements, in accordance with some embodiments. The magnetic field associated with the demagnetizing element 410 is aligned from a north pole of the demagnetizing element 410 to the south pole of the demagnetizing element 410 as illustrated by the field lines 1210, as depicted in FIG. 12A. In other words, the magnetic field can be described as wrapping around from one end of the demagnetizing element 410 to an opposite end of the demagnetizing element 410. The magnetic flux passing through the surface of the magnetic array 310 is, therefore, spread out laterally in a direction away from a longitudinal axis of the demagnetizing element 410. The longitudinal axis refers to an axis passing through the center of a coil wrapped around a ferromagnetic core of the demagnetizing element 410. It will be appreciated that the demagnetization pulse oscillates such that the polarity of the demagnetizing element 410 will change over time. Thus, the field lines 1210 shown in FIG. 12A merely illustrate the magnetic field at one instant in time where the north pole of the demagnetizing element 410 is proximate the magnetic array 310.

In contrast, the magnetic field associated with the demagnetizing element 1010 is aligned from a north pole of the first demagnetizing coil 1010-A to the south pole of the second demagnetizing coil 1010-B, and the magnetic field associated with the demagnetizing element 1010 is aligned from a north pole of the second demagnetizing coil 1010-B to the south pole of the first demagnetizing coil 1010-A as illustrated by the field lines 1220, as depicted in FIG. 12B. In other words, the magnetic field can be described as directed from one demagnetizing coil to the other demagnetizing coil. Although the magnetic field still also wraps around the outside of the first demagnetizing coil 1010-A and the outside of the second demagnetizing coil 1010-B, the magnetic flux passing through the surface of the magnetic array 310 is more concentrated directly under the demagnetizing coil 1010. The result is that the transition zone 1032 formed by the demagnetizing coil 1010 is much smaller than the transition zone 432 formed by the demagnetizing coil 432. The smaller transition zone makes it easier to correlate a target location of the demagnetizing coil 1010 relative to the magnetic array 310 with an expected reduction in the attractive force that will result from a demagnetization operation.

It will be appreciated that the field lines 1210 and 1220 illustrated in FIGS. 12A and 12B merely illustrate the component of the magnetic field generated by the demagnetizing element 410 and demagnetizing element 1010, respectively. Given that the magnetic array 310 is also magnetized, the resultant magnetic field combining, by superposition, the component of the magnetic field generated by the demagnetizing elements 410 or 1010 and the component of the magnetic field generated by the magnetic array 310 will be significantly different and would be illustrated by field lines having a much different shape than those shown in FIGS. 12A and 12B. The field lines 1210 and 1220 are, therefore, shown for illustrative purposes only to illustrate the magnetic flux through the surface of the magnetic array 310 generated by the demagnetizing elements 410 and 1010.

Figure 13:
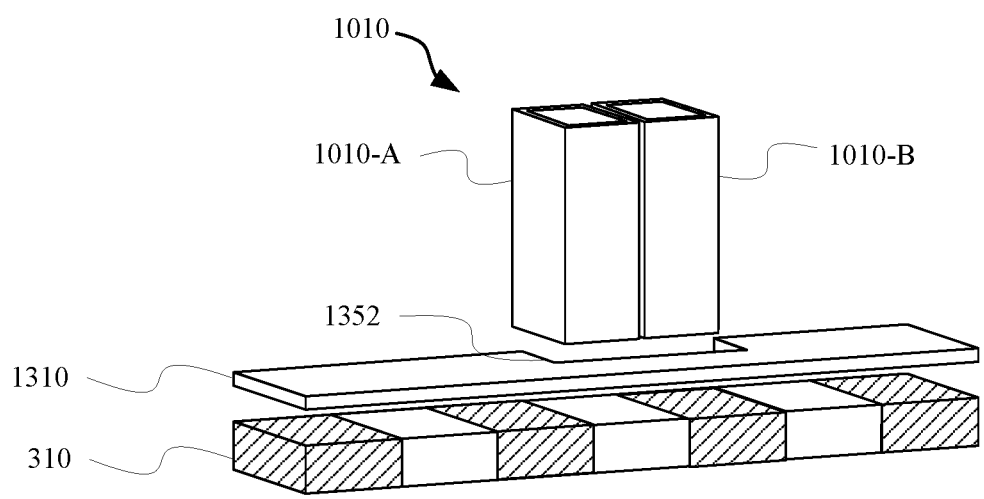
FIG. 13 illustrates a conductive mask utilized to control the shape of the demagnetized zone, in accordance with some embodiments.

FIG. 13 illustrates a conductive mask utilized to control the shape of the demagnetized zone, in accordance with some embodiments. The conductive mask 1310 can be made of any conductive material, such as copper, aluminum, or alloys thereof. The conductive mask 1310 is non-ferromagnetic. The conductive mask 1310 is disposed between the demagnetizing element 1010 and the magnetic array 310 during demagnetization. In some embodiments, the conductive mask 1310 is fixed relative the demagnetizing element 1010 and moves relative the magnetic array 310.

When the demagnetization pulse is applied to the demagnetizing element 1010, the external magnetic field generated by the demagnetizing element 1010 fluctuates according to the alternating current applied to the demagnetizing element 1010. This changing magnetic field produces eddy currents in the conducting mask 1310 that oppose the changing magnetic flux passing through the conductive mask 1310, in accordance with Lenz's Law ($\varepsilon = -\partial \Phi_B / \partial t$). Increasing the frequency of the alternating current will increase the change in magnetic flux per unit time, which increases the eddy current and generates a larger opposing magnetic field in the conductive mask 1310.

The conductive mask 1310 includes a cutout 1352. The cutout 1352 is negative space in the conductive mask 1310 and is designed to help shape the resulting demagnetized zone. In other words, the cutout 1352 removes conducting material from the conductive mask 1310 to limit the formation of eddy currents in specific locations proximate the magnetic array 310. By designing the shape of the cutout 1352, with knowledge of the relative location and size of the demagnetizing element 1010 and the magnetic array 310, the shape of the demagnetized zone formed in the magnetic elements 302 of the magnetic array 310 can be affected. It will be appreciated that the design of the conductive mask 1310 can be further used, along with a specified demagnetization pulse of particular strength and frequency, to create a desired demagnetized zone and try to minimize the transition zone within the calibrated magnetic array 310.

It will be appreciated that the inclusion of the conductive mask 1310 during the calibration procedure is optional. Furthermore, although not shown explicitly, the conductive mask 1310 positioned between the demagnetizing element 1010 and the magnetic array 310 can be used in conjunction with a magnetic shunt, such as magnetic shunts 420 and 1020, positioned on an opposite side of the magnetic array 310 from the demagnetizing element 1010 and the conductive mask 1310.

Figure 14:
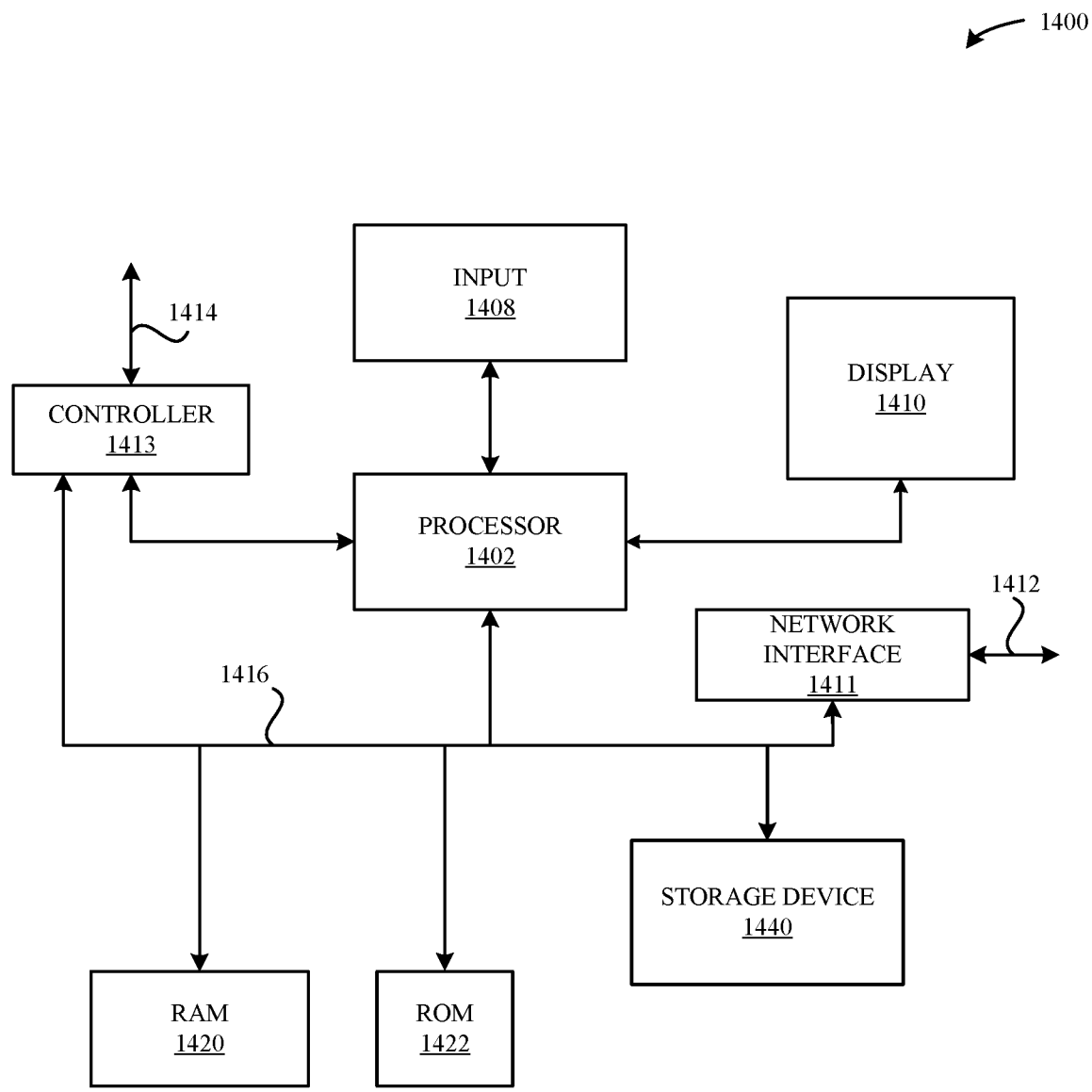
FIG. 14 illustrates a detailed view of an exemplary computing device that can be used to implement the various apparatus and/or methods described herein, in accordance with some embodiments.

FIG. 14 illustrates a detailed view of an exemplary computing device 1400 that can be used to implement the various apparatus and/or methods described herein, in accordance with some embodiments. In particular, the detailed view illustrates various components that can be included in the computing devices illustrated in FIGS. 1 to 13 and/or described herein. For example, the computing device 100, a control system for system 700, or any other device may be implemented, at least in part, to include the components of computing device 1400.

As depicted in FIG. 14, the computing device 1400 can include a processor 1402 that represents a microprocessor or controller for controlling the overall operation of computing device 1400. The computing device 1400 can also include a user input device 1408 that allows a user of the computing device 1400 to interact with the computing device 1400. For example, the user input device 1408 can take a variety of forms, such as a button, keypad, dial, touch screen, audio input interface, visual/image capture input interface, input in the form of sensor data, etc. Still further, the computing device 1400 can include a display 1410 (screen display) that can be controlled by the processor 1402 to present visual information to the user. A data bus 1416 can facilitate data transfer between at least a storage device 1440, the processor 1402, and a controller 1413. The controller 1413 can be used to interface with and control different equipment through an equipment control bus 1414. The computing device 1400 can also include a network/bus interface 1411 that couples to a data link 1412. In the case of a wireless connection, the network/bus interface 1411 can include a wireless transceiver.

The computing device 1400 also include a storage device 1440, which can comprise a single disk or a plurality of disks (e.g., hard drives), and includes a storage management module that manages one or more partitions within the storage device 1440. In some embodiments, storage device 1440 can include flash memory, semiconductor (solid state) memory or the like. The computing device 1400 can also include a Random Access Memory (RAM) 1420 and a Read-Only Memory (ROM) 1422. The ROM 1422 can store programs, utilities or processes to be executed in a non-volatile manner. The RAM 1420 can provide volatile data storage, and stores instructions related to the operation of the computing device 1400.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a non-transitory computer readable medium. The non-transitory computer readable medium is any data storage device that can store data which can thereafter be read by a computer system. Examples of the non-transitory computer readable medium include read-only memory, random-access memory, CD-ROMs, HDDs, DVDs, magnetic tape, and optical data storage devices. The non-transitory computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A portable electronic device comprising: a first part and a second a part that are pivotally coupled together; and a magnetic latch assembly comprising: a ferromagnetic attachment plate secured to the first part at a first location, and a magnetic array secured to the second part at a second location in accordance with the first location, the magnetic array having at least two magnetic elements wherein at least one of the magnetic elements includes (i) a first magnetic region having a first magnetic property, and (ii) a second magnetic region at least partially surrounded on two or more sides by the first magnetic region and defining a demagnetized zone, wherein the magnetic elements are each a monolithic substrate of magnetizable material.

2. The portable electronic device as recited in claim 1, wherein a latching force that maintains the magnetic latch assembly in a latched configuration comprises:
a first magnetic force between the first magnetic region and the ferromagnetic attachment plate; and a second magnetic force between the second magnetic region and the ferromagnetic attachment plate.

3. The portable electronic device as recited in claim 2 wherein the latched configuration comprises the ferromagnetic attachment plate and the magnetic array being in magnetic contact with each other.

4. The portable electronic device as recited in claim 2, wherein the first magnetic property includes a first magnetic polarity and a first magnetization level and the demagnetized zone includes demagnetization within the second magnetic region.

5. The portable electronic device as recited in claim 4, wherein the first magnetic property is fixed.

6. The portable electronic device as recited in claim 4, wherein t the latching force is based on the demagnetized zone.

7. The portable electronic device as recited in claim 6, wherein a second magnetic element of the magnetic array comprises a second demagnetized zone.

8. The portable electronic device as recited in claim 7, wherein the demagnetized zone extends into a second magnetic element of the magnetic array.

9. The portable electronic device as recited in claim 1, wherein the demagnetized zone is surrounded by a transition zone defined by a partially demagnetized zone.

10. A portable electronic device comprising: a two part housing that encloses a processor, the two part housing comprising a first part and a second part, the first part having a display that allows viewing of a visual content, and the second part having an input device that facilitates communication of an input instruction to the processor by way of a tactile input; a hinge assembly that pivotally couples the first part and the second part and is capable of maintaining the first and second parts in an open configuration such that the visual content is viewable and the input device is accessible to the tactile input; and an adjustable magnetic latch assembly located opposite the hinge assembly that is capable of maintaining the first and second parts in a latched configuration such that the visual content is unviewable and the input device is inaccessible to the tactile input, wherein the adjustable magnetic latch assembly comprises: a ferromagnetic attachment plate secured to the first part at a first location, and a linear magnetic array secured to the second part at a second location in accordance with the first location, the linear magnetic array having at least two individual magnetic elements at least one of which includes (i) a first magnetic region having a first magnetic property, and (ii) a second magnetic region at least partially surrounded on two or more sides by the first magnetic region and defining a demagnetized zone, wherein each of the at least two individual magnetic elements is a monolithic substrate of magnetizable material.

11. The portable electronic device as recited in claim 10, wherein the latched configuration is the linear magnetic array in magnetic proximity with the ferromagnetic attachment plate such that a latching force is provided, the latching force comprising: a first magnetic force between the first magnetic region and the ferromagnetic attachment plate; and a second magnetic force between the second magnetic region and the ferromagnetic attachment plate.

12. The portable electronic device as recited in claim 11, wherein the latching force is adjustable in accordance with an adjustment of the demagnetized zone in accordance with a magnetizing property of an externally applied magnetic field.

13. A portable electronic device comprising: a housing with a first part and a second part that are pivotally coupled together; and a magnetic latch assembly that provides a latching force that maintains the first and second parts in a closed contact with each other, the magnetic latch assembly including a ferromagnetic attachment plate secured to the first part at a first location and a linear magnetic array secured to the second part at a second location corresponding to the first location, wherein the linear magnetic array includes at least two individual magnetic elements each being a monolithic substrate of magnetizable material, wherein at least one of the at least two individual magnetic elements includes a first magnetic region having a first magnetic property and that at least partially surrounds a second magnetic region on two or more sides, the second magnetic region having an adjustable second magnetic property defined by a demagnetized zone.

14. The portable electronic device as recited in claim 13, wherein the latching force is adjustable in accordance with a corresponding adjustment of the adjustable second magnetic property.

15. The portable electronic device as recited in claim 14, wherein the latching force includes:
- a first magnetic force between the first magnetic region and the ferromagnetic attachment plate; and
- a second magnetic force between the second magnetic region and the ferromagnetic attachment plate.

16. The portable electronic device as recited in claim 15, wherein the corresponding adjustment of the adjustable second magnetic property is in accordance with a magnetic property of an external magnetizing magnetic field applied thereto.

17. The portable electronic device as recited in claim 15, wherein an adjustment of the adjustable second magnetic property causes a corresponding adjustment of the second magnetic force.

\* \* \* \* \*

UNITED STATES PATENT AND TRADEMARK OFFICE
CERTIFICATE OF CORRECTION

PATENT NO. : 11,886,253 B1
APPLICATION NO. : 16/289607
DATED : January 30, 2024
INVENTOR(S) : John C. Difonzo et al.

Page 1 of 1

It is certified that error appears in the above-identified patent and that said Letters Patent is hereby corrected as shown below:

In the Claims

Column 19, Line 49 (Claim 1): "a second a part" should read --a second part--.

Column 20, Line 13 (Claim 6): "wherein t the" should read --wherein the--.

Signed and Sealed this
Twenty-third Day of April, 2024

Katherine Kelly Vidal
*Director of the United States Patent and Trademark Office*